US012725449B2

(12) United States Patent
Tate et al.

(10) Patent No.: US 12,725,449 B2
(45) Date of Patent: Sep. 1, 2026

(54) IMAGE PROCESSING APPARATUS CONFIGURED TO PERFORM FACE RECOGNITION, IMAGE PROCESSING METHOD, AND STORAGE MEDIUM

(71) Applicant: CANON KABUSHIKI KAISHA, Tokyo (JP)

(72) Inventors: Shunta Tate, Tokyo (JP); Yasuhiro Okuno, Tokyo (JP); Hideki Sorakado, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 18/514,325

(22) Filed: Nov. 20, 2023

(65) Prior Publication Data

US 2024/0087364 A1 Mar. 14, 2024

Related U.S. Application Data

(63) Continuation of application No. PCT/JP2022/021288, filed on May 24, 2022.

(30) Foreign Application Priority Data

May 26, 2021 (JP) ................................ 2021-088227
Nov. 26, 2021 (JP) ................................ 2021-192448

(51) Int. Cl.
*G06V 40/16* (2022.01)
*G06T 7/00* (2017.01)
(Continued)

(52) U.S. Cl.
CPC .......... *G06V 40/172* (2022.01); *G06T 7/0002* (2013.01); *G06T 7/62* (2017.01);
(Continued)

(58) Field of Classification Search
CPC . G06T 2207/30168; G06T 2207/30201; G06T 7/0002; G06T 7/62; G06V 10/44;
(Continued)

(56) References Cited

U.S. PATENT DOCUMENTS 10,956,819 B2 3/2021 Shazeer et al.
2018/0373924 A1* 12/2018 Yoo .................... G06V 10/454

FOREIGN PATENT DOCUMENTS

CN 110689030 A 1/2020
CN 111414858 A 7/2020
(Continued)

OTHER PUBLICATIONS

Deng, J., et al., “Arcface: Additive Angular Margin Loss for Deep Face Recognition”, CVPR, pp. 4690-4699.
(Continued)

*Primary Examiner* — Manuchehr Rahmjoo
(74) *Attorney, Agent, or Firm* — Canon U.S.A., Inc., IP Division

(57) ABSTRACT

An image processing apparatus includes a first acquisition unit configured to acquire a first feature amount from a first image based on a first trained model configured to extract a feature from an image, a second acquisition unit configured to acquire a second feature amount from a second image based on a second trained model determined based on a state of the second image and configured to extract a feature from an image, and a verification unit configured to determine, based on the first feature amount and the second feature amount, whether an object in the first image and an object in the second image are the same. The second trained model is a model having learned the second feature amount in a same feature space as that for the first trained model.

15 Claims, 27 Drawing Sheets

(51) Int. Cl.
*G06T 7/62* (2017.01)
*G06V 10/44* (2022.01)
*G06V 10/60* (2022.01)

(52) U.S. Cl.
CPC .............. *G06V 10/44* (2022.01); *G06V 10/60* (2022.01); *G06T 2207/30168* (2013.01); *G06T 2207/30201* (2013.01)

(58) Field of Classification Search
CPC .... G06V 10/454; G06V 10/60; G06V 10/764; G06V 10/82; G06V 40/172
See application file for complete search history.

(56) References Cited

FOREIGN PATENT DOCUMENTS

| | | | |
|---|---|---|---|
| CN | 111582090 | A | 8/2020 |
| CN | 111639596 | A | 9/2020 |
| JP | 2007-280250 | A | 10/2007 |
| JP | 4957056 | B2 | 6/2012 |
| JP | 2017-117024 | A | 6/2017 |
| JP | 2018-147240 | A | 9/2018 |
| JP | 2018-160237 | A | 10/2018 |
| JP | 2018-165980 | A | 10/2018 |
| JP | 2018-165983 | A | 10/2018 |
| JP | 2019-102081 | A | 6/2019 |
| JP | 2020-115311 | A | 7/2020 |
| WO | 2020/121425 | A1 | 6/2020 |

OTHER PUBLICATIONS

Schroff, F., et al., "FaceNet: A Unified Embedding for Face Recognition and Clustering", CVPR, 2015, pp. 815-823.
Anonymous, Face Recognition using Siamese Network.
Wassan Hayale et al., Facial Expression Recognition Using Deep Siamese Neural Networks with a Supervised Loss function.

* cited by examiner 1
101
FIRST IMAGE ACQUISITION UNIT
102
SECOND IMAGE ACQUISITION UNIT
IMAGE
103
OBJECT STATE DETERMINATION UNIT
SIGNAL
104
STORAGE UNIT
TRANSFORMATION PARAMETER
105
FIRST FEATURE AMOUNT TRANSFORMATION UNIT
106
SECOND FEATURE AMOUNT TRANSFORMATION UNIT
FEATURE AMOUNT
FEATURE AMOUNT
107
FEATURE AMOUNT VERIFICATION UNIT START
S401
INITIALIZE PARAMETER OF FIRST LEARNING MODEL
S402
ACQUIRE FIRST IMAGE GROUP
S403
ACQUIRE FIRST LEARNING FEATURE AMOUNT FROM FIRST IMAGE GROUP
S404
CALCULATE LOSS
S405
LEARN FIRST PARAMETER SET
S406
HAS LEARNING CONVERGED?
NO
YES
S407
STORE FIRST PARAMETER SET
END

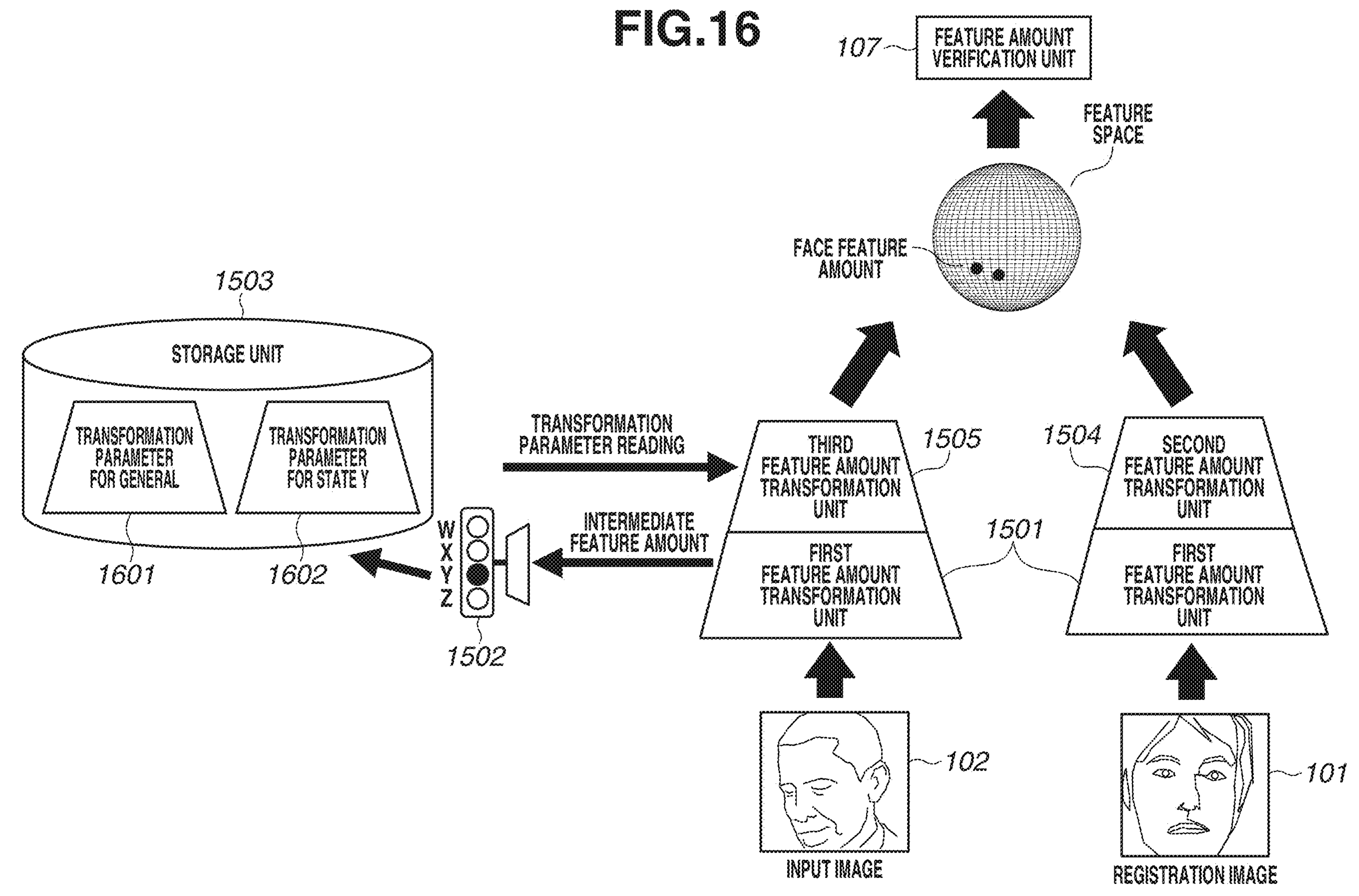
FIG.16
107
FEATURE AMOUNT VERIFICATION UNIT
FEATURE SPACE
FACE FEATURE AMOUNT
1503
STORAGE UNIT
TRANSFORMATION PARAMETER FOR GENERAL
TRANSFORMATION PARAMETER FOR STATE Y
1601
1602
TRANSFORMATION PARAMETER READING
INTERMEDIATE FEATURE AMOUNT
W
X
Y
Z
1502
THIRD FEATURE AMOUNT TRANSFORMATION UNIT
1505
FIRST FEATURE AMOUNT TRANSFORMATION UNIT
1501
1504
SECOND FEATURE AMOUNT TRANSFORMATION UNIT
FIRST FEATURE AMOUNT TRANSFORMATION UNIT
102
INPUT IMAGE
101
REGISTRATION IMAGE

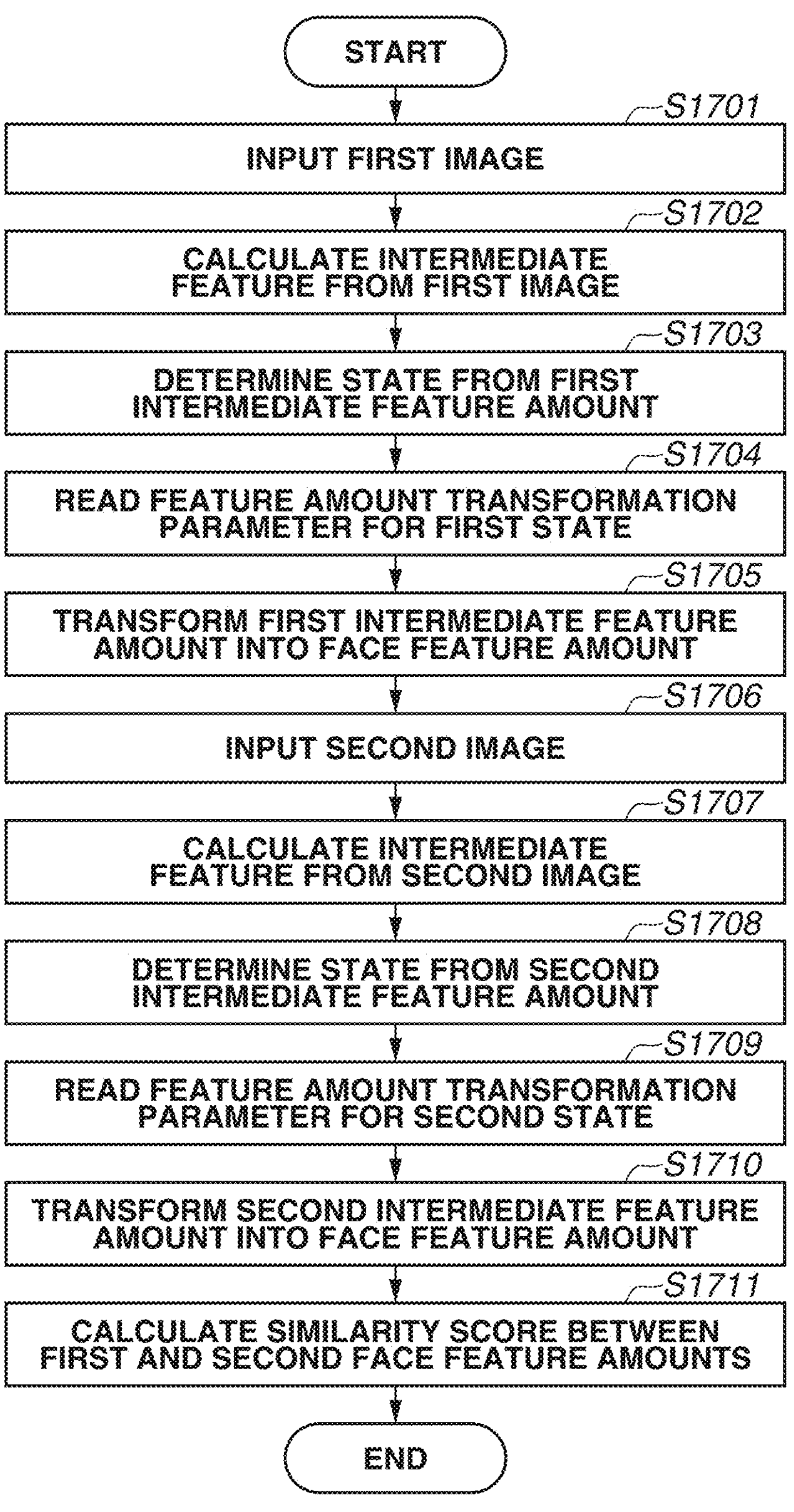
FIG.17
START
S1701
INPUT FIRST IMAGE
S1702
CALCULATE INTERMEDIATE FEATURE FROM FIRST IMAGE
S1703
DETERMINE STATE FROM FIRST INTERMEDIATE FEATURE AMOUNT
S1704
READ FEATURE AMOUNT TRANSFORMATION PARAMETER FOR FIRST STATE
S1705
TRANSFORM FIRST INTERMEDIATE FEATURE AMOUNT INTO FACE FEATURE AMOUNT
S1706
INPUT SECOND IMAGE
S1707
CALCULATE INTERMEDIATE FEATURE FROM SECOND IMAGE
S1708
DETERMINE STATE FROM SECOND INTERMEDIATE FEATURE AMOUNT
S1709
READ FEATURE AMOUNT TRANSFORMATION PARAMETER FOR SECOND STATE
S1710
TRANSFORM SECOND INTERMEDIATE FEATURE AMOUNT INTO FACE FEATURE AMOUNT
S1711
CALCULATE SIMILARITY SCORE BETWEEN FIRST AND SECOND FACE FEATURE AMOUNTS
END

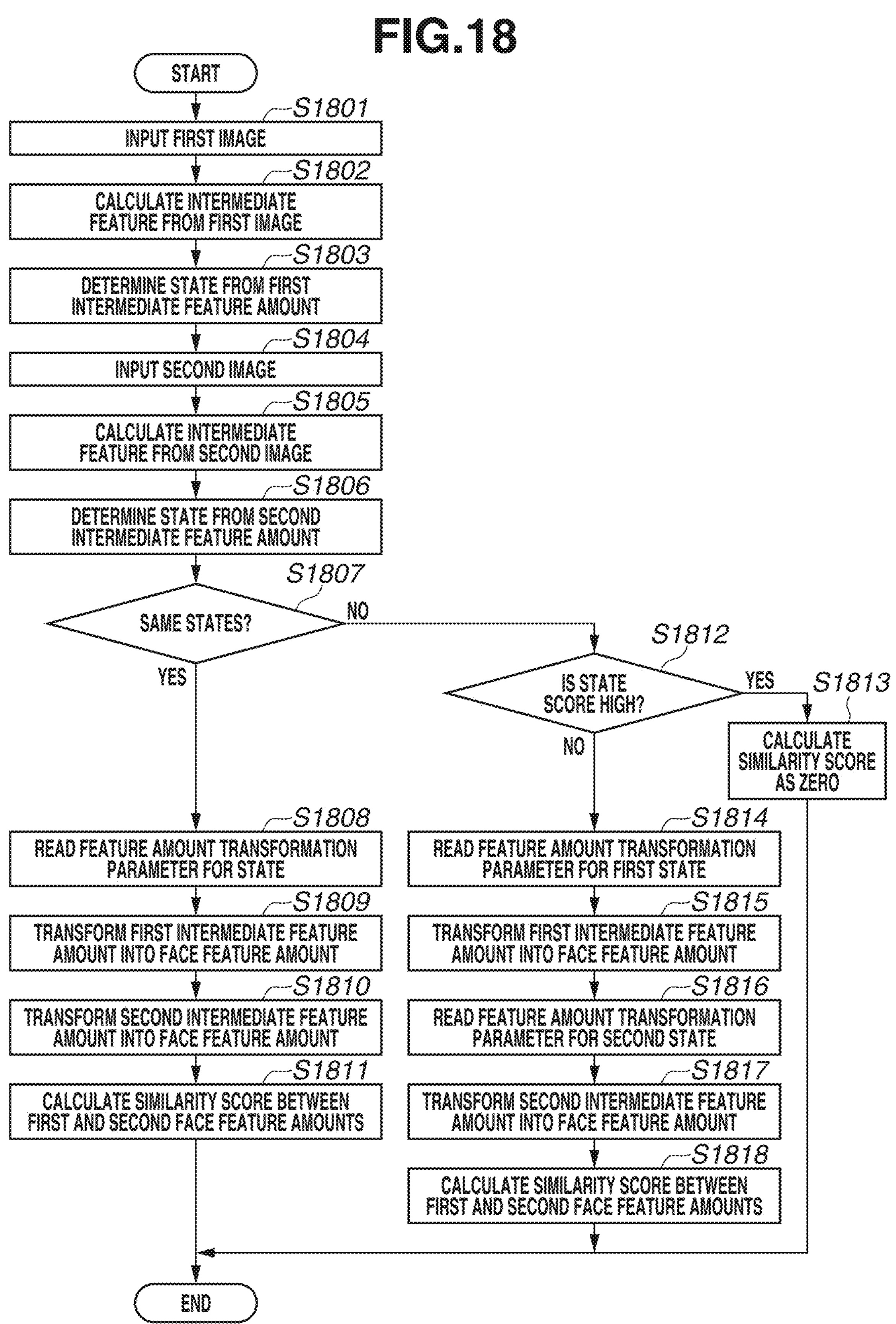
FIG.18
START
S1801
INPUT FIRST IMAGE
S1802
CALCULATE INTERMEDIATE FEATURE FROM FIRST IMAGE
S1803
DETERMINE STATE FROM FIRST INTERMEDIATE FEATURE AMOUNT
S1804
INPUT SECOND IMAGE
S1805
CALCULATE INTERMEDIATE FEATURE FROM SECOND IMAGE
S1806
DETERMINE STATE FROM SECOND INTERMEDIATE FEATURE AMOUNT
S1807
SAME STATES?
NO
YES
S1812
IS STATE SCORE HIGH?
YES
NO
S1813
CALCULATE SIMILARITY SCORE AS ZERO
S1808
READ FEATURE AMOUNT TRANSFORMATION PARAMETER FOR STATE
S1809
TRANSFORM FIRST INTERMEDIATE FEATURE AMOUNT INTO FACE FEATURE AMOUNT
S1810
TRANSFORM SECOND INTERMEDIATE FEATURE AMOUNT INTO FACE FEATURE AMOUNT
S1811
CALCULATE SIMILARITY SCORE BETWEEN FIRST AND SECOND FACE FEATURE AMOUNTS
S1814
READ FEATURE AMOUNT TRANSFORMATION PARAMETER FOR FIRST STATE
S1815
TRANSFORM FIRST INTERMEDIATE FEATURE AMOUNT INTO FACE FEATURE AMOUNT
S1816
READ FEATURE AMOUNT TRANSFORMATION PARAMETER FOR SECOND STATE
S1817
TRANSFORM SECOND INTERMEDIATE FEATURE AMOUNT INTO FACE FEATURE AMOUNT
S1818
CALCULATE SIMILARITY SCORE BETWEEN FIRST AND SECOND FACE FEATURE AMOUNTS
END

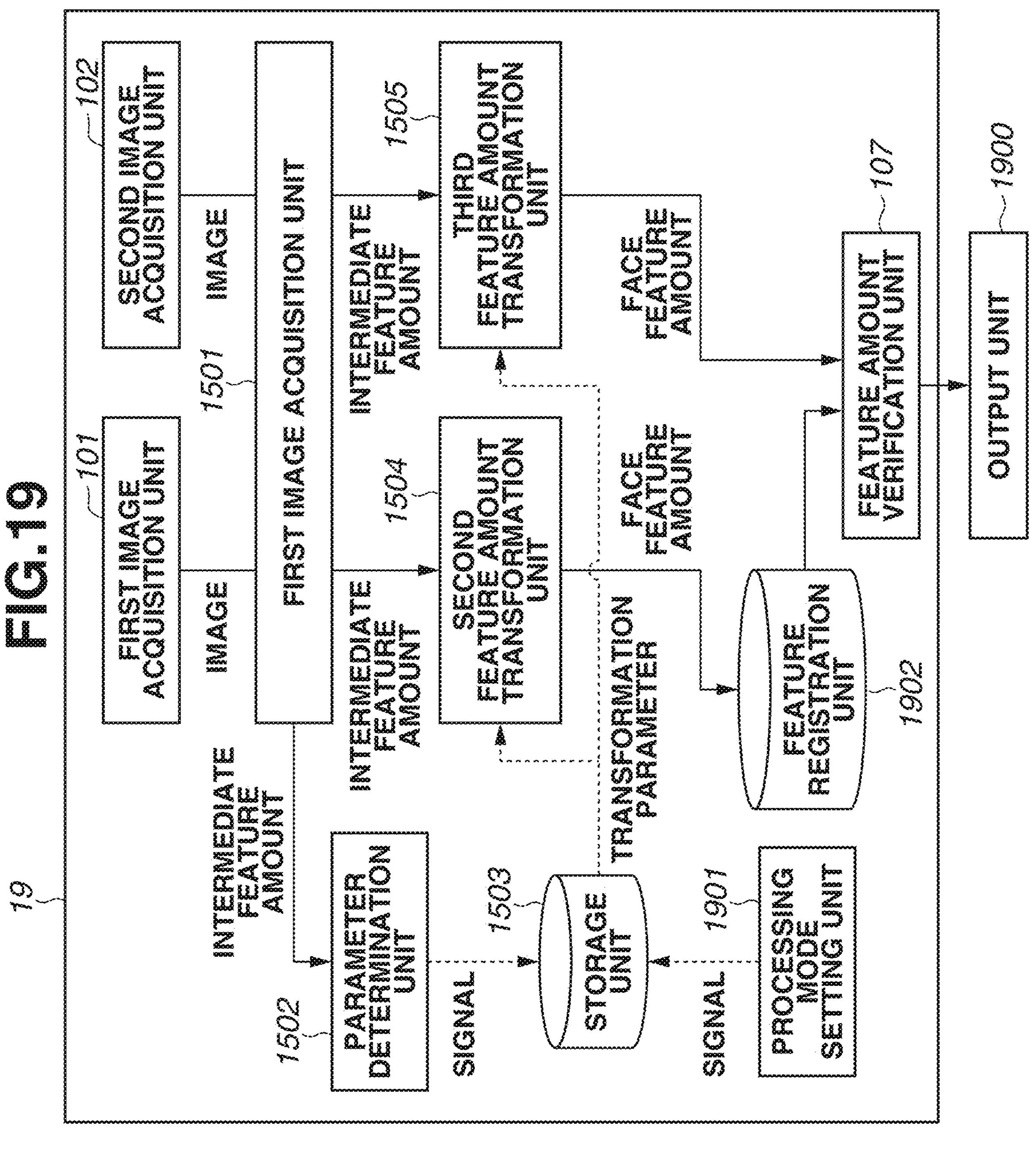
FIG.19
19
FIRST IMAGE ACQUISITION UNIT
101
SECOND IMAGE ACQUISITION UNIT
102
IMAGE
IMAGE
FIRST IMAGE ACQUISITION UNIT
1501
INTERMEDIATE FEATURE AMOUNT
INTERMEDIATE FEATURE AMOUNT
INTERMEDIATE FEATURE AMOUNT
PARAMETER DETERMINATION UNIT
1502
SIGNAL
STORAGE UNIT
1503
SECOND FEATURE AMOUNT TRANSFORMATION UNIT
1504
THIRD FEATURE AMOUNT TRANSFORMATION UNIT
1505
TRANSFORMATION PARAMETER
FACE FEATURE AMOUNT
FACE FEATURE AMOUNT
FEATURE REGISTRATION UNIT
1902
SIGNAL
PROCESSING MODE SETTING UNIT
1901
FEATURE AMOUNT VERIFICATION UNIT
107
OUTPUT UNIT
1900

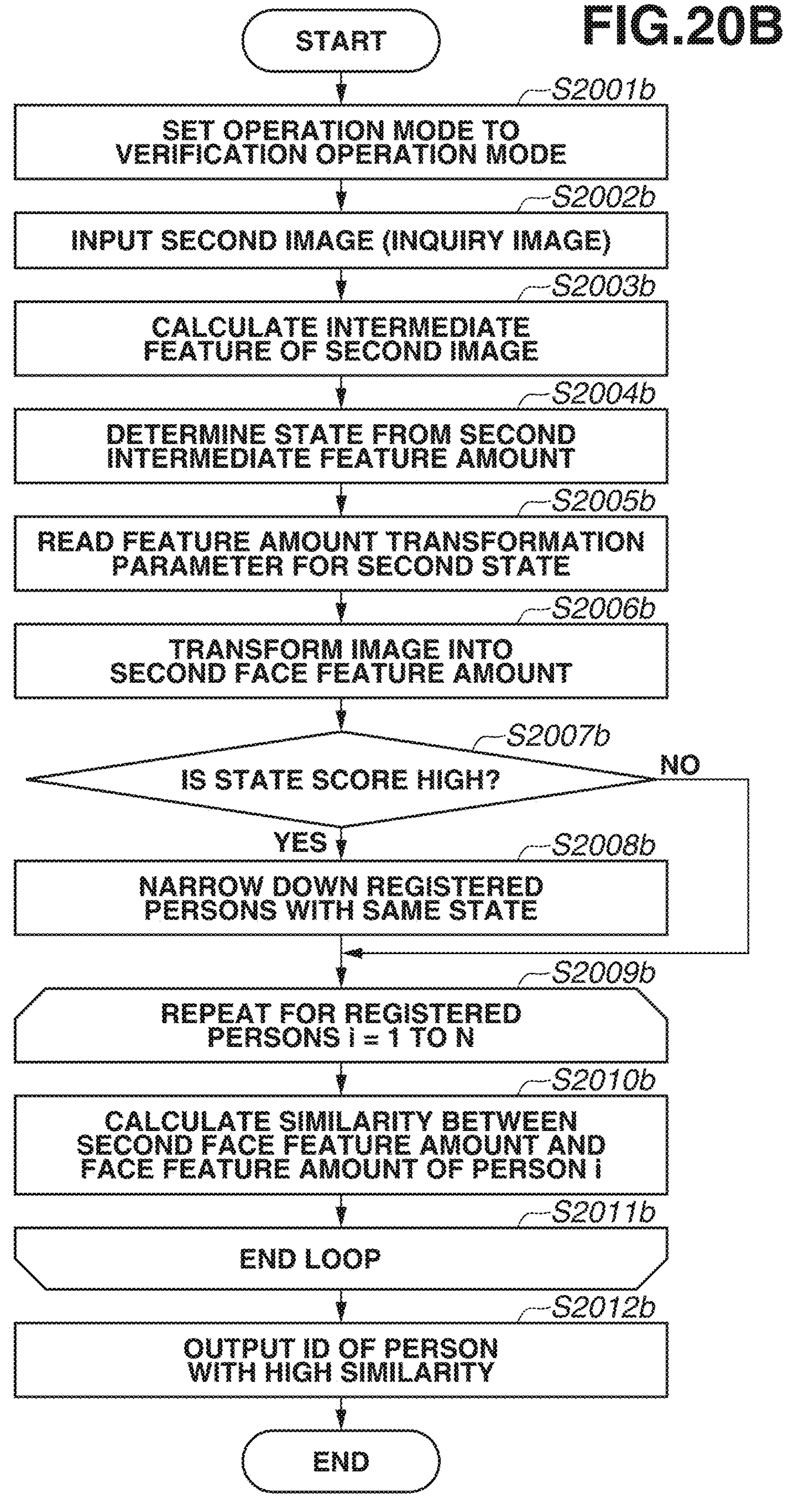
FIG.20B
START
S2001b
SET OPERATION MODE TO VERIFICATION OPERATION MODE
S2002b
INPUT SECOND IMAGE (INQUIRY IMAGE)
S2003b
CALCULATE INTERMEDIATE FEATURE OF SECOND IMAGE
S2004b
DETERMINE STATE FROM SECOND INTERMEDIATE FEATURE AMOUNT
S2005b
READ FEATURE AMOUNT TRANSFORMATION PARAMETER FOR SECOND STATE
S2006b
TRANSFORM IMAGE INTO SECOND FACE FEATURE AMOUNT
S2007b
IS STATE SCORE HIGH?
NO
YES
S2008b
NARROW DOWN REGISTERED PERSONS WITH SAME STATE
S2009b
REPEAT FOR REGISTERED PERSONS i = 1 TO N
S2010b
CALCULATE SIMILARITY BETWEEN SECOND FACE FEATURE AMOUNT AND FACE FEATURE AMOUNT OF PERSON i
S2011b
END LOOP
S2012b
OUTPUT ID OF PERSON WITH HIGH SIMILARITY
END

IMAGE PROCESSING APPARATUS CONFIGURED TO PERFORM FACE RECOGNITION, IMAGE PROCESSING METHOD, AND STORAGE MEDIUM

CROSS-REFERENCE TO RELATED APPLICATIONS

This application is a Continuation of International Patent Application No. PCT/JP2022/021288, filed May 24, 2022, which claims the benefit of Japanese Patent Applications No. 2021-088227, filed May 26, 2021, and No. 2021-192448, filed Nov. 26, 2021, all of which are hereby incorporated by reference herein in their entirety.

BACKGROUND OF THE INVENTION

Field of the Invention

The present invention relates to a face recognition technique using images.

Background Art

There is a face recognition technique for determining whether the face of a person in an image is the same person as a person in another image. In face recognition, verification is difficult if states of targets, such as object appearance angles, illuminations, and presence/absence of an accouterment, such as a mask and glasses, in imaging and/or conditions of imaging environments are different. Hence, Patent Document 1 discusses determining, in extracting a feature of a person from an image, whether the person is wearing a mask and/or glasses and dynamically changing an image area for feature amount extraction based on the determination result.

CITATION LIST

Patent Literature

PTL 1: Japanese Patent No. 4957056
PTL 2: U.S. patent Ser. No. 10/956,819

Non Patent Literature

NPL 1: Deng, et. Al., ArcFace: Additive Angular Margin Loss for Deep Face Recognition. In CVPR, 2019
NPL 2: Florian Schroff, Dmitry Kalenichenko, and James Philbin. Facenet: A unified embedding for face recognition and clustering. In CVPR, 2015

According to Patent Document 1, it is necessary to store features of a plurality of patterns based on states such as accessories in registered persons.

SUMMARY OF THE INVENTION

The present invention is directed to reducing information to be registered in verifying objects differing from each other in state.

To solve the foregoing issues, an image processing apparatus according to the present invention includes a first acquisition unit configured to acquire a first feature amount from a first image based on a first trained model configured to extract a feature from an image, a second acquisition unit configured to acquire a second feature amount from a second image based on a second trained model determined based on a state of the second image and configured to extract a feature from an image, and a verification unit configured to determine, based on the first feature amount and the second feature amount, whether an object in the first image and an object in the second image are the same. The second trained model is a model having learned the second feature amount in a same feature space as that for the first trained model.

Further features of the present invention will become apparent from the following description of exemplary embodiments with reference to the attached drawings.

BRIEF DESCRIPTION OF THE DRAWINGS

FIG. 16 is a schematic diagram illustrating an example of operations of a verification process.

FIG. 17 is a flowchart illustrating a process that the image processing apparatus executes.

FIG. 18 is a flowchart illustrating a process that the image processing apparatus executes.

FIG. 19 is a block diagram illustrating an example of a functional configuration of an image processing apparatus.

FIG. 20B is a flowchart illustrating a process that the image processing apparatus executes.

DESCRIPTION OF THE EMBODIMENTS

First Exemplary Embodiment

Figure 1:
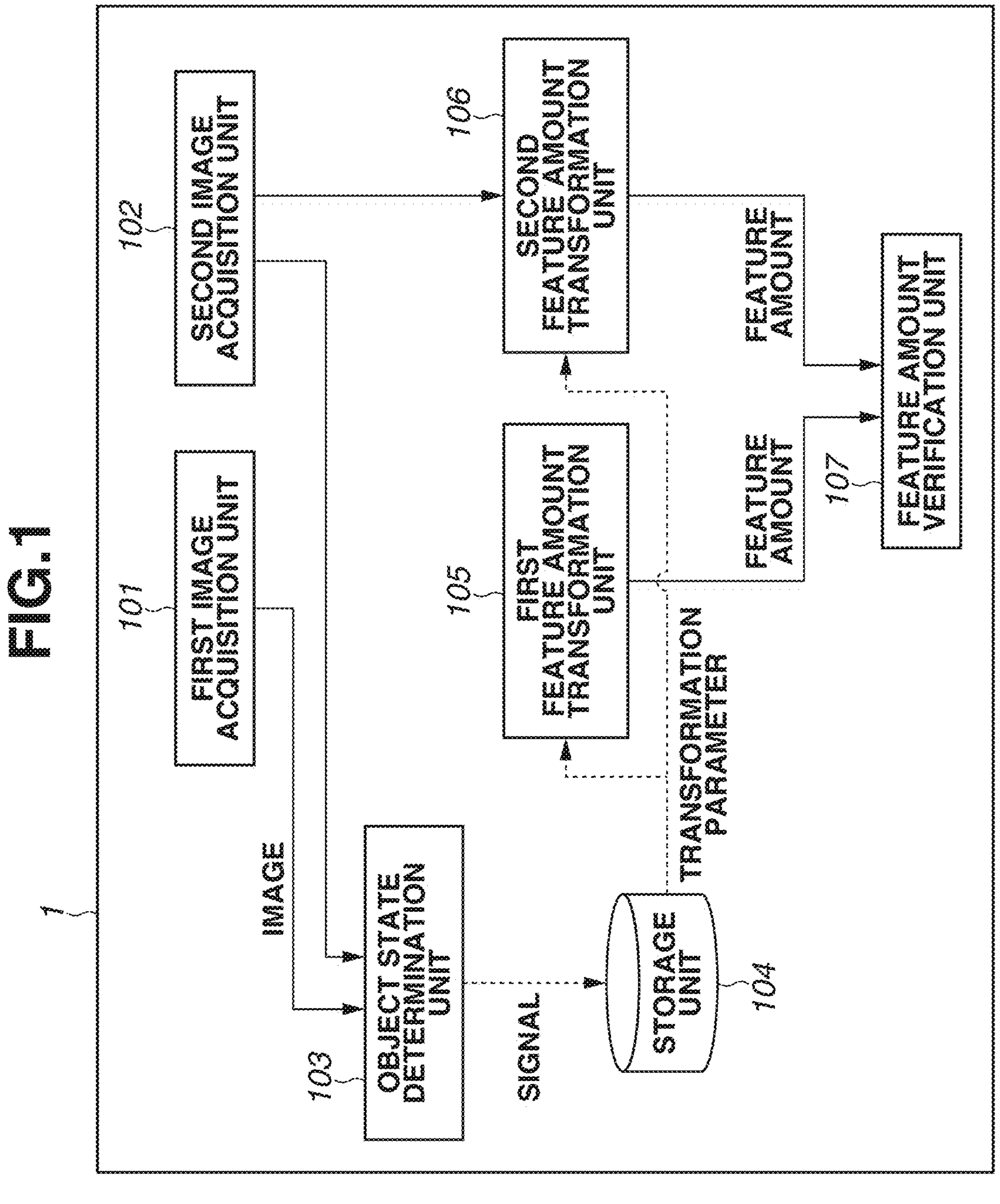
FIG. 1 is a block diagram illustrating an example of a functional configuration of an image processing apparatus.

An image processing apparatus according to an exemplary embodiment of the present invention will be described below with reference to the drawings. Items with the same reference numeral in the drawings perform the same operation, and redundant descriptions thereof are omitted. Further, component elements described herein are mere examples and are not intended to limit the scope of the invention.

Conventional face recognition technologies have two major issues: (1) It is necessary to store features of a plurality of patterns based on states regarding accouterments and the like in registering a person. (2) It is necessary to perform feature amount transformation for a registration image after a state of a person regarding, for example, a mask, is determined. Thus, in the case of a large number of registered persons to be subjected to verification, a large amount of storage space is required in the above method (1), and an issue of inferior verification speed arises in the above method (2). The image processing apparatus according to the present exemplary embodiment transforms images into feature amounts using different feature amount transformation units in accordance with states of an object in the images at the time of imaging and then performs verification. This improves accuracy of the verification compared with conventional methods with which different feature amount transformation units are not used in accordance with states. Further, according to the present invention, learning is adjusted using different transformation units, to make feature amounts to be output similar to each other for the same object. Thus, although different transformation methods are used, the feature amounts are useable without distinction in verification processing. Hence, the feature amounts are storable with a small memory amount as compared with conventional methods with which feature amounts of registration image patterns are extracted. Furthermore, the calculation cost and speed of the verification processing improve.

FIG. 1 is a diagram illustrating an example of a functional configuration of an image processing apparatus. An image processing apparatus 1 includes a first image acquisition unit 101, a second image acquisition unit 102, an object state determination unit 103, a storage unit 104, a first feature amount transformation unit 105, a second feature amount transformation unit 106, and a feature amount verification unit 107. Details thereof will be described below.

Figure 2:
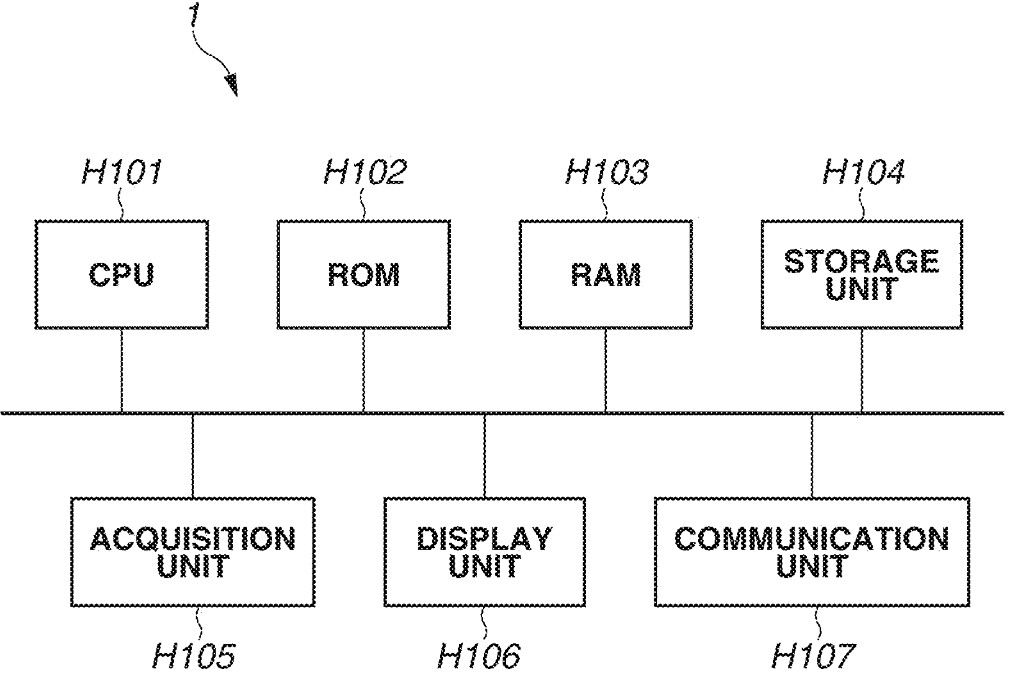
FIG. 2 is a block diagram illustrating an example of a hardware configuration of the image processing apparatus.

FIG. 2 is a diagram illustrating a hardware configuration of the image processing apparatus 1 according to the present exemplary embodiment. A central processing unit (CPU) H101 controls the entire apparatus by executing control programs stored in a read-only memory (ROM) H102. A random access memory (RAM) H103 temporarily stores various data from the component elements. Furthermore, programs are loaded to allow the CPU H101 to execute the program. A storage unit H104 stores transformation parameters for performing image transformation according to the present exemplary embodiment. As a medium of the storage unit H104, a hard disk drive (HDD), a flash memory, and various optical media can be used. An acquisition unit H105 which includes a keyboard, a touch panel, and a dial, receives inputs from users, and is used to configure a line-of-sight setting in performing subject image reconstruction. A display unit H106 includes a liquid crystal display and displays subject image reconstruction results. Further, the apparatus can communicate with an imaging apparatus and other apparatuses via a communication unit H107.

<Image Verification Process Phase>

Figure 3A:
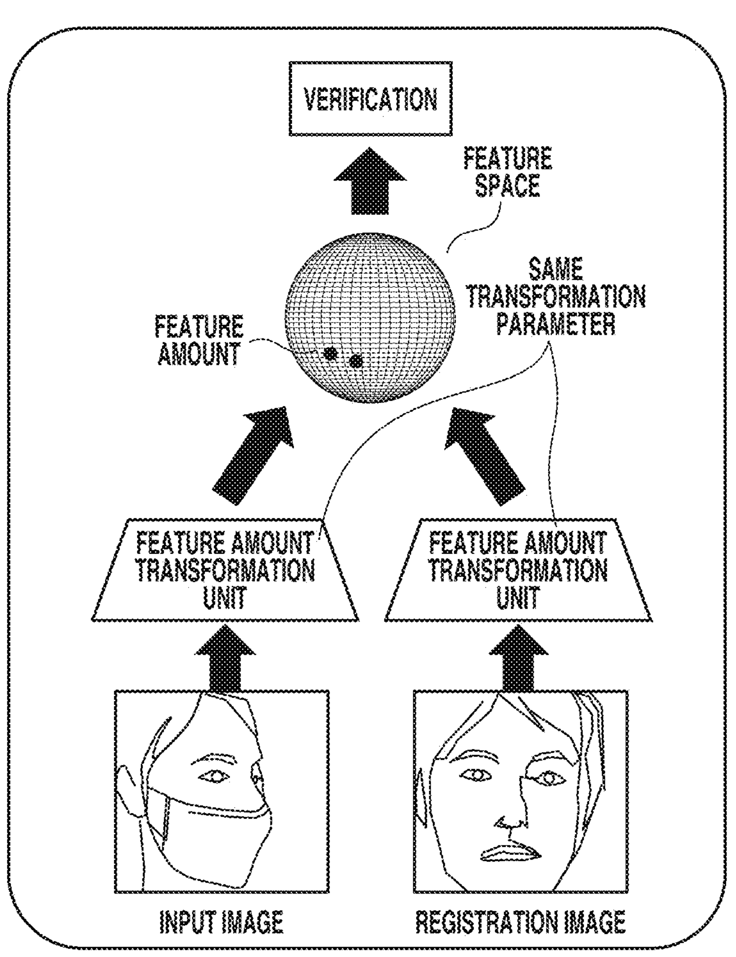
FIG. 3A is a schematic diagram illustrating an example of operations of a verification process.
Figure 3B:
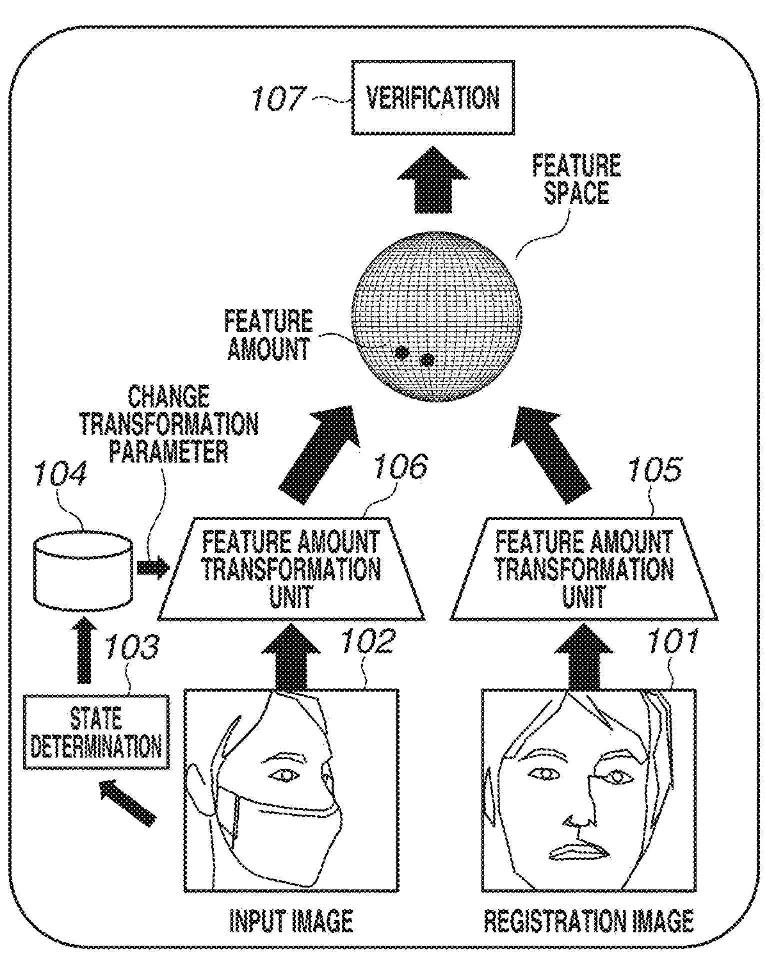
FIG. 3B is a schematic diagram illustrating an example of operations of a verification process.

FIGS. 3A and 3B are schematic diagrams illustrating a verification process according to the present exemplary embodiment and illustrate differences between a method according to the present invention and a conventional method. FIG. 3A illustrates a conventional method in which a features amount transformation is performed, with the same parameter, on an input image including a recognition process target person and a registration image including a registered person. In this case, a significant change in appearance, such as presence or absence of a mask or sunglasses being worn, often causes a decrease in accuracy. Meanwhile, an attempt to support every change in appearance often leads to an increase in configuration size of feature amount transformation units. FIG. 3B illustrates an example of a schematic diagram according to the present invention. In FIG. 3B, in response to an input of an input image, the object state determination unit 103 determines a state of a subject, such as whether the subject is wearing a mask. In accordance with this determination result, the feature amount transformation unit 106 reads an appropriate transformation parameter from the storage unit 104 and performs feature amount transformation. A plurality of types of transformation parameters is learned for states of persons and imaging environments. Since learning specially aimed at states of subjects is individually performed on the transformation parameters, robust verification is still realized even for a significant change in appearance, such as presence or absence of a mask and/or sunglasses.

In the method according to the present exemplary embodiment, learning is performed so that the feature amounts have a high similarity for the same object irrespective of a transformation parameter used in the transformation (a method for the learning method will be described below). Thus, the feature amount verification unit 107 is to only calculate a similarity based on a basic method using, for example, an inner product and/or an angle between the feature amounts, and no special processing is required. Thus, a single type of similarity is useable as a uniform measurement for the verification irrespective of object states. For example, in the method discussed in Patent Document 1, it is necessary to store the feature amounts of registered persons corresponding in number to the feature extraction methods. In contrast to this, in the method according to the present exemplary embodiment, a single transformation parameter is applied to registered persons, so that the feature amounts to be registered can be reduced.

Figure 4:
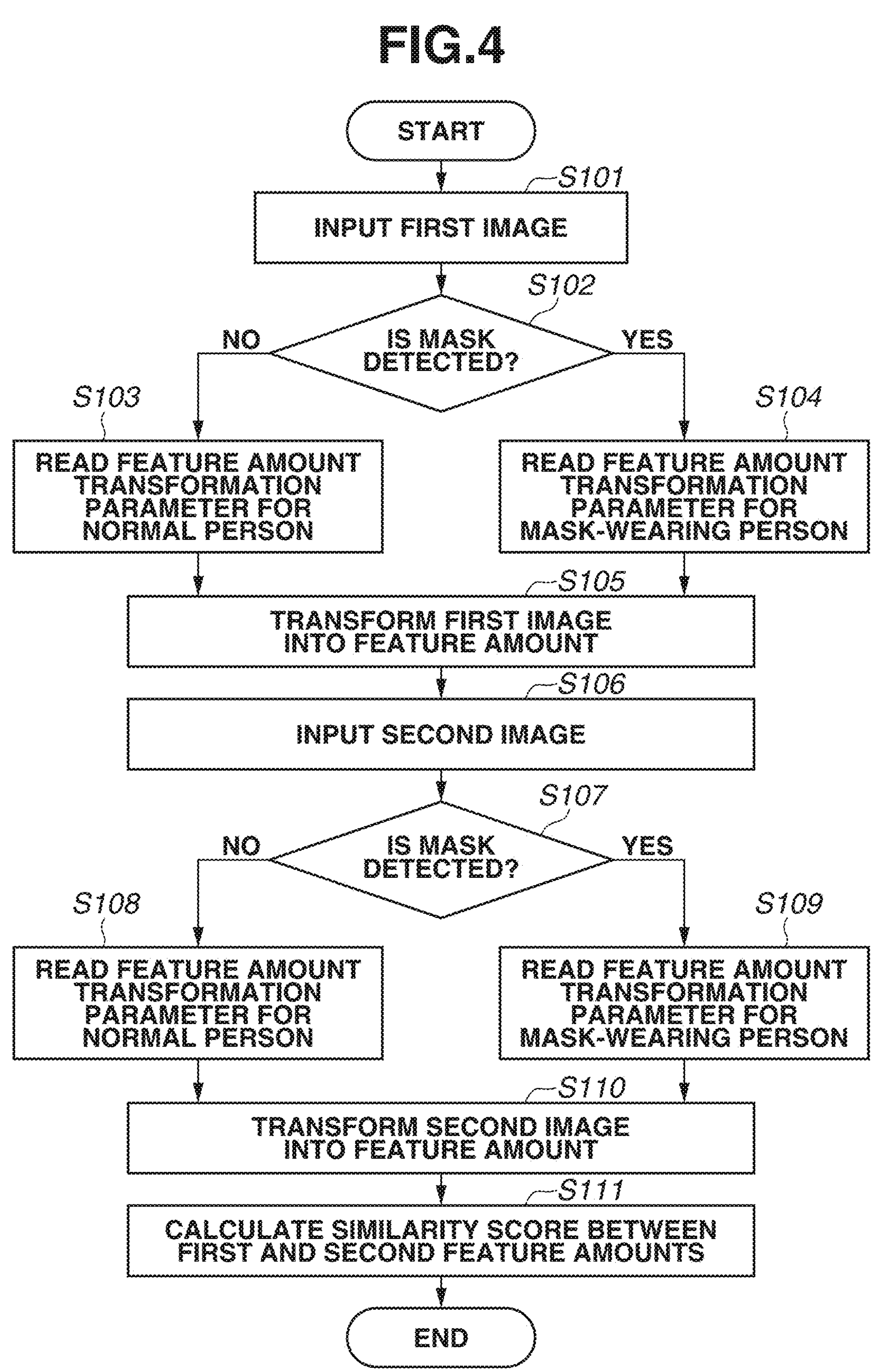
FIG. 4 is a flowchart illustrating a process that the image processing apparatus executes.

Next, a verification processing procedure will be described below with reference to FIG. 4. The present exemplary embodiment is directed to determining whether persons in two person images that are input are the same person or different persons based on feature amounts of the images. The processing in the flowchart in FIG. 4 is executed by the CPU H101, which is a computer in FIG. 2, in accordance with a computer program stored in the storage unit H104. In the following descriptions, the letter "S" is added to the beginning of each step to omit the term "step".

Initially, in step S101, the first image acquisition unit 101 acquires a first image (first image) including a recognition target object (here, person). In step S102, the object state determination unit 103 determines whether the first image satisfies a predetermined condition. In a case where the predetermined condition is satisfied, the object state determination unit 103 determines that a state of the object is a normal state or an imaging environment is in a normal state (a state close to a learned environment). In other cases, such as a case where a mask is worn and/or a case where there is a change in illuminance of the environment, the object state determination unit 103 determines that the state is not a normal state. More specifically, the object state determination unit 103 determines whether the person in the first image is wearing a mask in this step. A template matching or the like is used as a method of detecting a mask. If the predetermined condition is satisfied (no mask is worn) (NO in step S102), the processing proceeds to step S103. If the predetermined condition is unsatisfied (a mask is worn) (YES in step S102), the processing proceeds to step S104.

In step S103, the first feature amount transformation unit (first feature acquisition unit) 105 reads feature amount transformation parameters (first parameter set) for normal persons and sets the read parameters in a trained model. The trained model is a neural network for acquiring feature amounts of objects from images. The trained model with the first parameter set will be referred to as "first trained model". In step S104, the first feature amount transformation unit 105 reads feature amount transformation parameters (second parameter set) for mask-wearing persons and sets the read parameters in a trained model. The trained model with the second parameter set will be referred to as "second trained model". Here, the feature amount transformation unit 105 includes, for example, a known convolutional neural network discussed in Non-patent Document 1. Alternatively, the feature amount transformation unit 105 includes a deep neural network (hereinafter, referred to as "DNN") referred to as "transformer network", which is known in Patent Document 2. In other words, the feature amount transformation unit 105 is a trained model for acquiring features of persons in images and acquires a feature amount using the learned parameter set in accordance with a state of a person in an image (Non-patent Document 1: Deng, et. Al., ArcFace: Additive Angular Margin Loss for Deep Face Recognition. In CVPR, 2019) (Patent Document 2: U.S. Pat. No. 10,956,819). The transformation parameters for the feature amount here are various parameters of, for example, the number of layers of neurons, the number of neurons, and connection weights. Next, in step S105, the first feature amount transformation unit 105 transforms features amounts from the first image received from the first image acquisition unit 101 based on the first trained model or the second trained model.

Next in steps S106 to S110, the foregoing processes of steps S101 to S105 are performed on a second image (second image). In other words, if a person in the second image is not wearing a mask, a feature amount is acquired from the first trained model with the first parameter set. If the person in the second image is wearing a mask, a feature amount is acquired based on the second trained model with the second parameter set. The foregoing process is performed by the second image acquisition unit 102 and the second feature amount transformation unit (second feature acquisition unit) 106. Thus, the first image and the second image are transformed into feature amounts. The feature amounts are represented as $f_1$ and $f_2$, where $f_1$ and $f_2$ are one-dimensional vectors as in Non-patent Document 1 (the transformation into the one-dimensional vectors is performed through a process of a fully-connected layer of the DNN). Further, while configurations of DNN parameters that the first feature amount transformation unit 105 and the second feature amount transformation unit 106 receive are not necessarily to be the same, the numbers of output channels of neurons in final layers are the same. Thus, dimensional lengths of $f_1$ and $f_2$ are the same.

Next in step S111, the feature amount verification unit 107 calculates a similarity score between the two feature amounts. More specifically, the feature amount verification unit 107 determines whether the object in the first image is the same as the object in the second image, based on the first feature amount and the second feature amount. If the similarity score between the first feature amount and the second feature amount is higher than or equal to a predetermined threshold, the objects in the two images are the same. If the similarity score between the first feature amount and the second feature amount is lower than the predetermined threshold, the objects in the two images are different. While a plurality of indicators for determining a similarity between feature amounts is known, an angle between feature amount vectors is used here as in the method in Non-patent Document 1. A similarity score is calculated as follows.

$$\text{Similarity score}(f_1, f_2) := \cos(\theta_{12}) = \langle f_1, f_2 \rangle / (|f_1| \cdot |f_2|). \quad \text{(Equation 1)}$$

In Equation 1, $\theta_{12}$ is an angle formed by the feature amount vectors $f_1$ and $f_2$, $\langle x, y \rangle$ is an inner product of x and y, and $|x|$ is a length of x. If the similarity score is higher than or equal to the predetermined threshold, the feature amount verification unit 107 determines the persons to be the same person. Otherwise, the feature amount verification unit 107 determines the persons to be different persons. The operations of the verification process are then ended. Alternatively, a common image acquisition unit and a common feature amount transformation unit can acquire feature amounts of the first image and the second image.

<Learning Process Phase>

Figure 14:
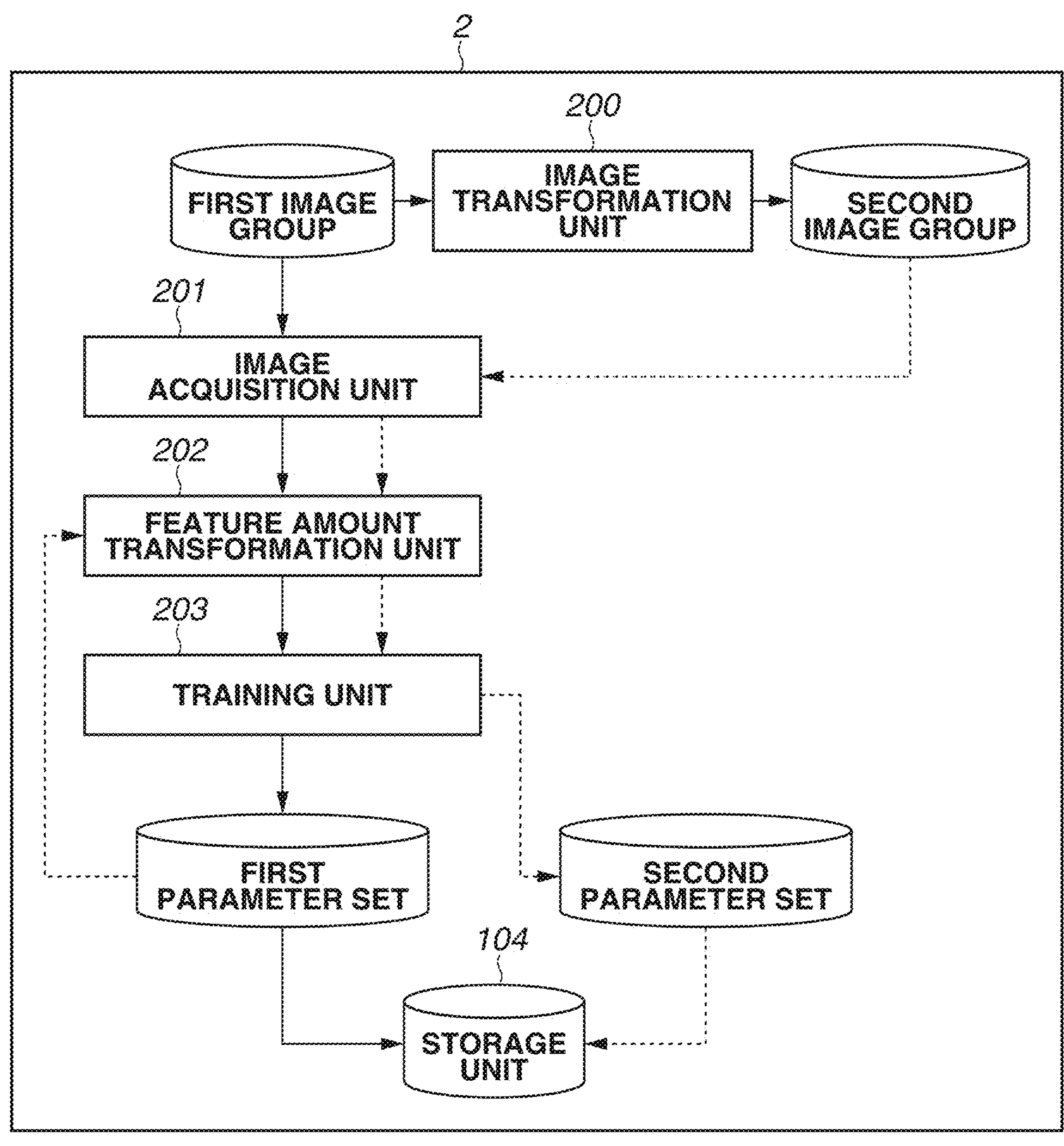
FIG. 14 is a block diagram illustrating an example of a functional configuration of an image processing apparatus.

A learning phase according to the present exemplary embodiment will be described below. Here, learning is performed using a known "representative vector method" in Non-patent Document 1. The representative vector method is a face recognition learning method in which feature amount vectors each representing a person are set and the set feature amount vectors are used in combination to improve learning efficiency. For more details, see Non-Patent Document 1. An image processing apparatus 2 in the learning process phase is illustrated in FIG. 14. An image transformation unit 200 transforms a first image group into a second image group. The first image group is a set of reference images of a target (e.g., face images of a person without accouterments), and the second image group is a set of images indicating a predetermined state of the target (e.g., face images of the person wearing a mask). More specifically, an image of an accouterment, such as a mask, is combined with a face image, or an image is transformed to provide a certain level of brightness. An image acquisition unit 201 acquires an image group for use in learning. Here, two or more types of parameter sets are learned, so that two or more types of image group are acquired. A feature amount transformation unit 202 acquires a feature amount from each image using a parameter set corresponding to a state of the image and a learning model that extracts a feature amount from the image. A training unit 203 trains the parameter sets and the learning model that extracts feature amounts from images. A description will be provided of an example where a first learning model and a second learning model are alternately trained, in the present exemplary embodiment.

Figure 5A:
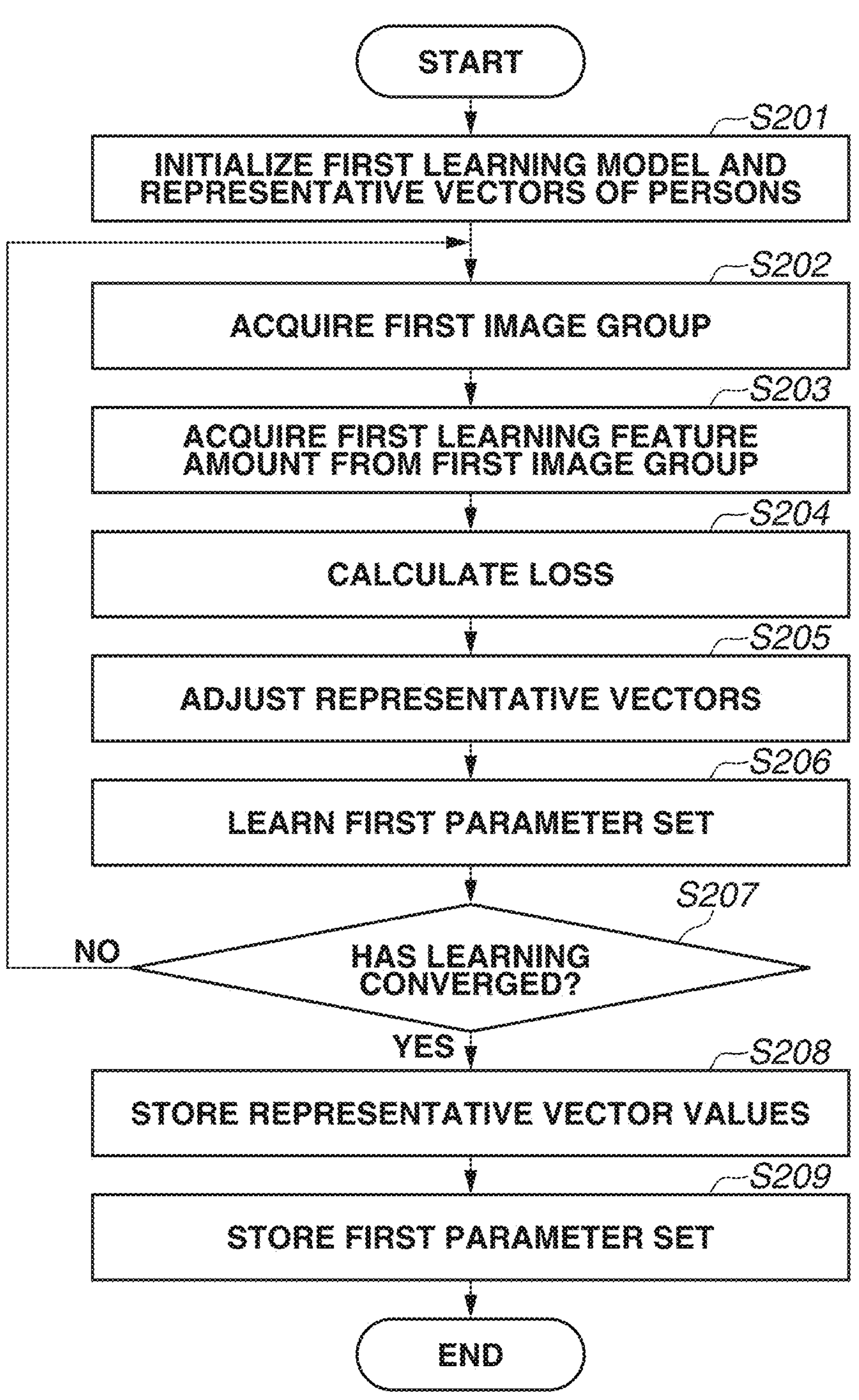
FIG. 5A is a flowchart illustrating a process that the image processing apparatus executes.
Figure 5B:
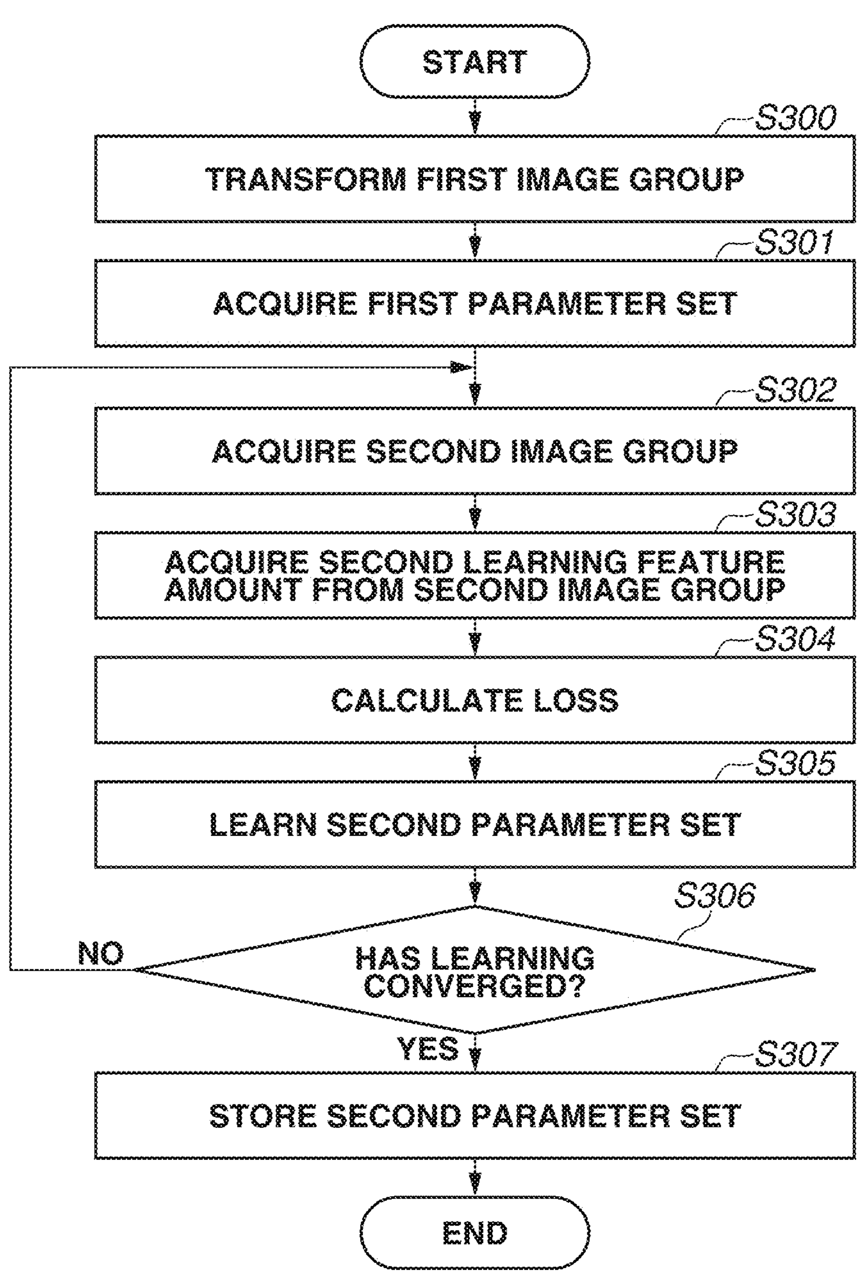
FIG. 5B is a flowchart illustrating a process that the image processing apparatus executes.

FIGS. 5A and 5B illustrate a processing procedure of the present embodiment. The processing illustrated in FIG. 5A will be referred to as first learning processing, and the processing illustrated in FIG. 5B will be referred to as second learning processing. In the first learning processing, learning of normal feature amount transformation is performed using the image group (first image group) for persons without masks. In the second learning processing, learning specialized for persons with masks is performed using the image group (second image group) for persons wearing masks. In FIG. 14, a solid-line portion indicates a configuration that is used in the first learning processing, and a broken-line portion indicates a configuration that is used in the second learning processing.

Details of the first learning processing basically follow the method discussed in Non-patent Document 1. FIG. 5A illustrates processing in the learning phase that the image processing apparatus performs. Initially in step S201, the feature amount transformation unit 202 initializes the parameter set of the first learning model and the representative vectors $v_1$ to $v_n$ with random numbers, where 1 to n are identifiers (IDs) of all persons included in learning images. Each representative vector v is a d-dimensional vector (where d is a predetermined value).

Next in step S202, the image acquisition unit 201 acquires images $I_1$ to $I_m$ randomly selected from the first image group. The first image group serves as reference image group including a plurality of images of persons without a mask, and includes one or more images for each person. Each image is provided with person ID information.

Next, in step S203, the feature amount transformation unit 202 acquires a first learning feature amount $f_i$ by inputting the image $I_i$ of the first image group to the first learning model. The learning feature amount $f_i$ herein is a d-dimensional vector. Next in step S204, the feature amount transformation unit 202 calculates a loss value based on similarities (intra-class similarities) between the feature amounts of the person images and the representative vectors and similarities (inter-class similarities) between the feature amounts of the representative vectors of the persons and other persons.

$$\text{Intra-class similarity score}(f_i)=\text{similarity score}(f_i,v_y(i)),$$

$$\text{Inter-class similarity score}(f_i)=\Sigma_{j\neq y(-i)}\text{similarity score}(f_i,v_j). \quad \text{(Equations 2)}$$

In Equations 2, y(i) is an ID number of a person in the image $I_i$. A loss value for use in learning is obtained by calculating the sum for each image as follows.

$$\text{Loss value}=\Sigma_i\ \text{inter-class similarity score}(f_i)-\lambda\,\text{intra-class similarity score}(f_i). \quad \text{(Equation 3)}$$

In Equation 3, λ is a weight parameter for balance of learning. The loss value described above is a mere example, and there are various other known methods, such as a method using similarity scores with margins and a method using cross entropy. For more details, see Non-Patent Document 1.

Next, in steps S205 and S206, the training unit 203 updates the first parameter set of the feature amount transformation unit 202 (first learning model) to reduce the loss value. In step S205, the feature amount transformation unit 202 updates the representative vector values, and in step S206, the feature amount transformation unit 202 updates the first parameter set. An error back-propagation method, which is used commonly in the DNN, is used so that minuscule update is performed to reduce the loss value. Thus, the representative vectors are improved to be more functional as values representing the features of the persons, and the first trained model is improved so that feature amounts of the same person become close to each other.

The foregoing learning processing is repeated a predetermined number of times or until the learning converges in step S207. Next in steps S208 and S209, the storage unit 104 stores the first parameter set and the values of the representative vector $v_1$ to $v_n$.

Figure 6:
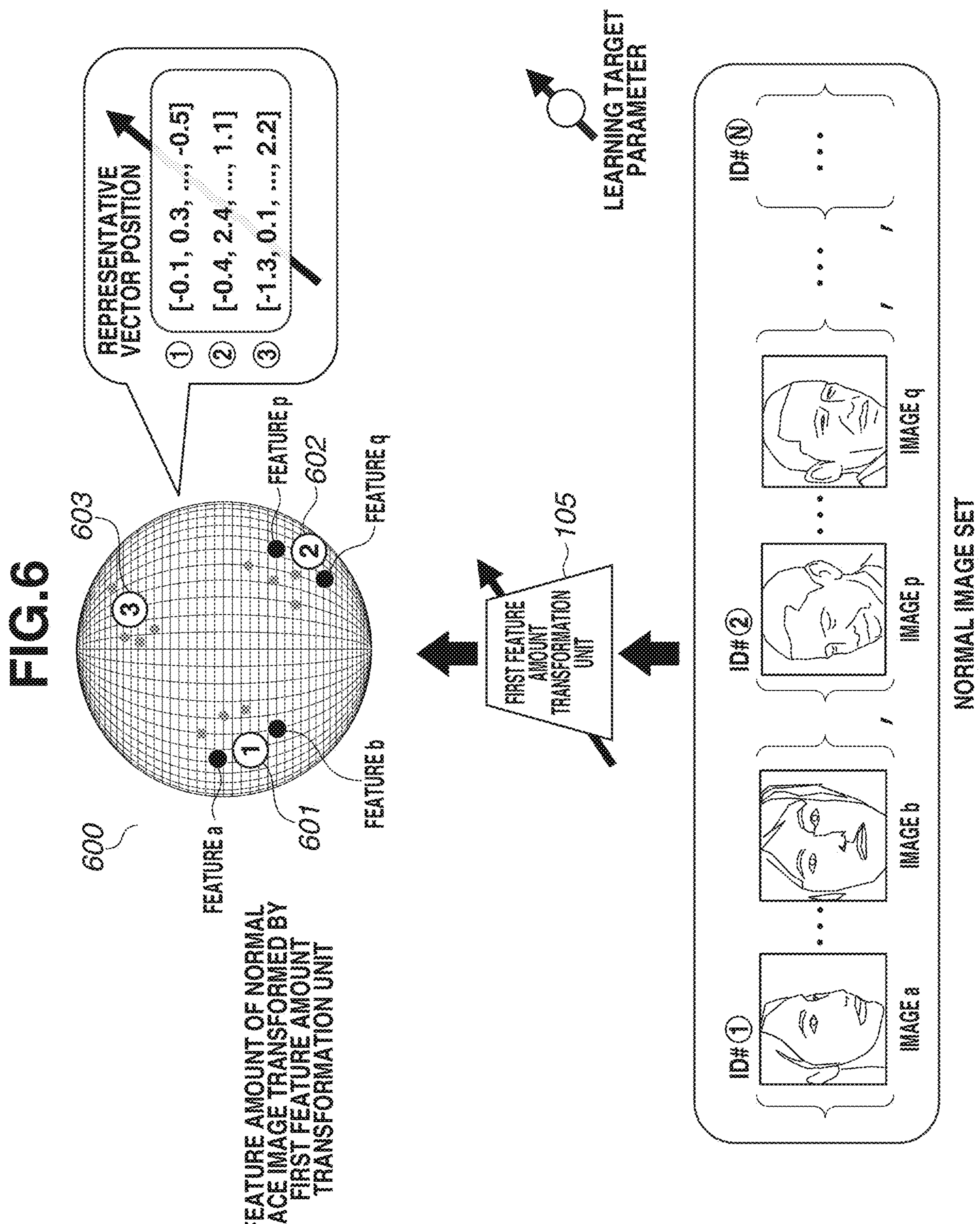
FIG. 6 is a schematic diagram illustrating an example of operations of a learning process.

FIG. 6 schematically illustrates an example of a result at the end of the first learning processing. On a feature space 600, representative vectors 601, 602, and 603 are obtained as feature vectors representing persons of ID1 to ID3. Furthermore, the first parameter set is appropriately learned so that features a and b, features p and q, and the like of the persons are located near their representative vectors (in FIG. 6, features of images of the persons are indicated by solid black circles).

Next, the second learning processing is performed. In this processing, the DNN (second learning model) of the feature amount transformation for mask-wearing persons is learned using the image group (second image group) for learning mask-wearing persons.

The second learning processing will be described below with reference to FIG. 5B. As a preparation, in step S300, the image transformation unit 200 transforms the first image group into the second image group that satisfies a predetermined condition. More specifically, images combined with an accouterment, such as a mask and sunglasses, or images different in illuminance are generated using an existing transformation method. The operation in step S300 may be skipped if the second image group is prepared in advance. In step S301, the feature amount transformation unit 202 acquires the first parameter set and sets the first parameter set to initial values of the parameters for the second learning model. Next in steps S302 to S306, as in the processing in FIG. 5A, the second parameters for the second learning model are learned. Details of the processing, the loss calculation, and other operations are similar to those in steps S202 to S207 described above, except that the updating of the representative vectors $v_1$ to $v_n$ in step S205 is not performed and the values stored in step S208 in the previous phase are fixed and used. Thus, learning is performed so that the feature amounts of the mask-wearing persons become closer to the representative vectors of the persons without a mask. If the learning has converged, in step S307, the storage unit 104 stores the second parameter set, and the learning is ended. The values of the representative vectors are used only during the learning and are not used during the verification operations.

Figure 7:
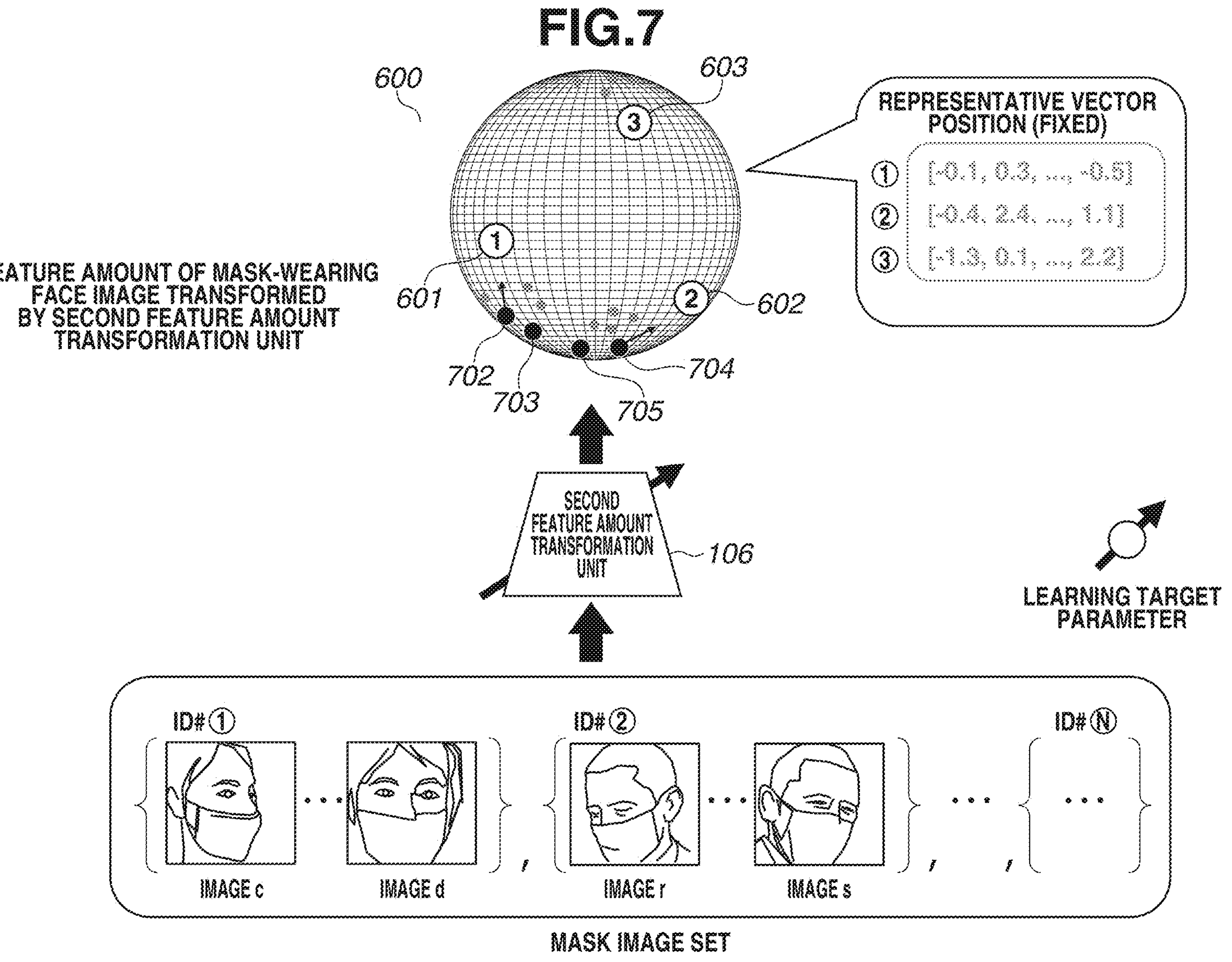
FIG. 7 is a schematic diagram illustrating an example of operations of a learning process.

FIG. 7 is a diagram schematically illustrating the start point for the second learning processing. The positions of the representative vectors 601, 602, and 603 are fixed and not to be updated through learning thereafter. Feature amounts 702 and 703 of images c and d of a person wearing a mask are located at a distance from the representative vector 601 of the person. The learning adjustment of the second learning processing is performed so that the second parameter set is learned to bring the features of the persons closer to their representative vectors, as indicated by an arrow added to a feature c (reference numeral 702). Thus, by the time the learning converges, the feature amounts using the first parameter set with respect to the images (a and b in FIG. 6) of the person without a mask and the feature amounts using the second parameter set with respect to the images (c and d in FIG. 7) of the person wearing a mask become closer to each other on the feature space.

<Derivative Embodiment of Learning Method>

Figure 8A:
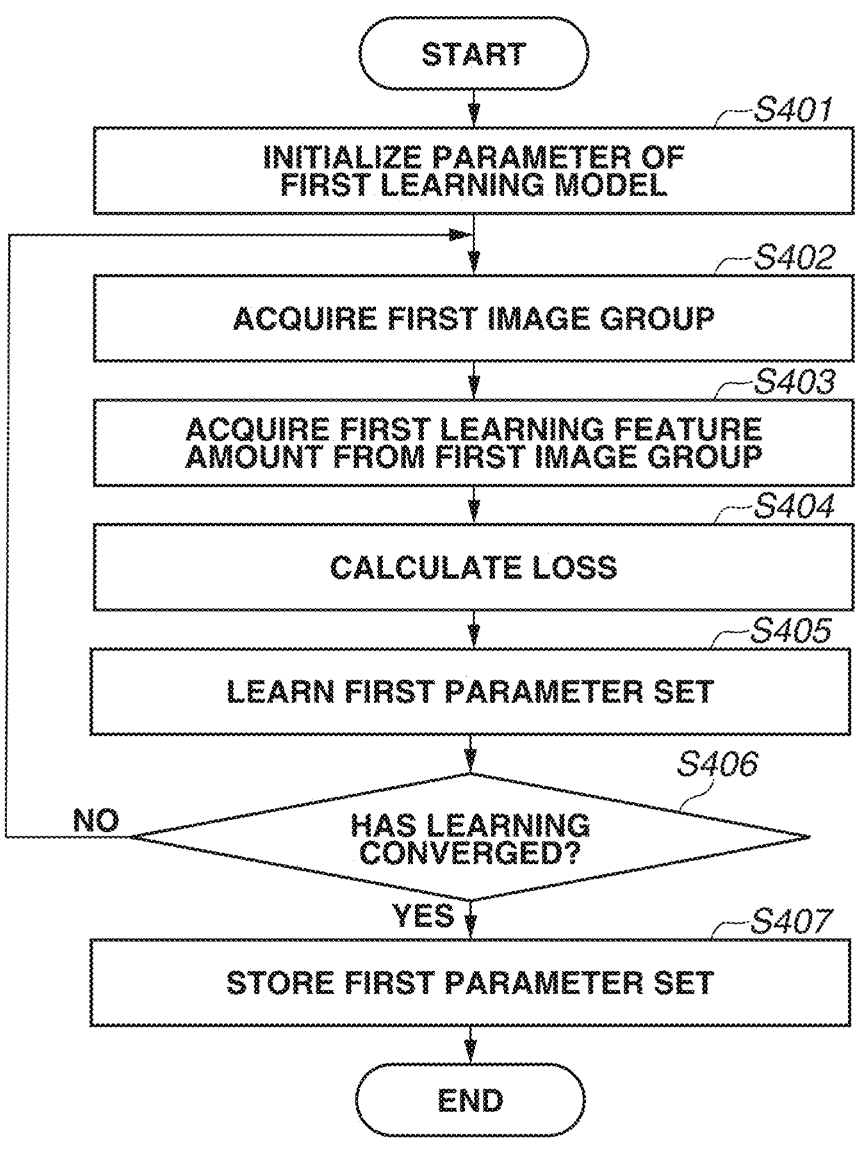
FIG. 8A is a flowchart illustrating a process that the image processing apparatus executes.
Figure 8B:
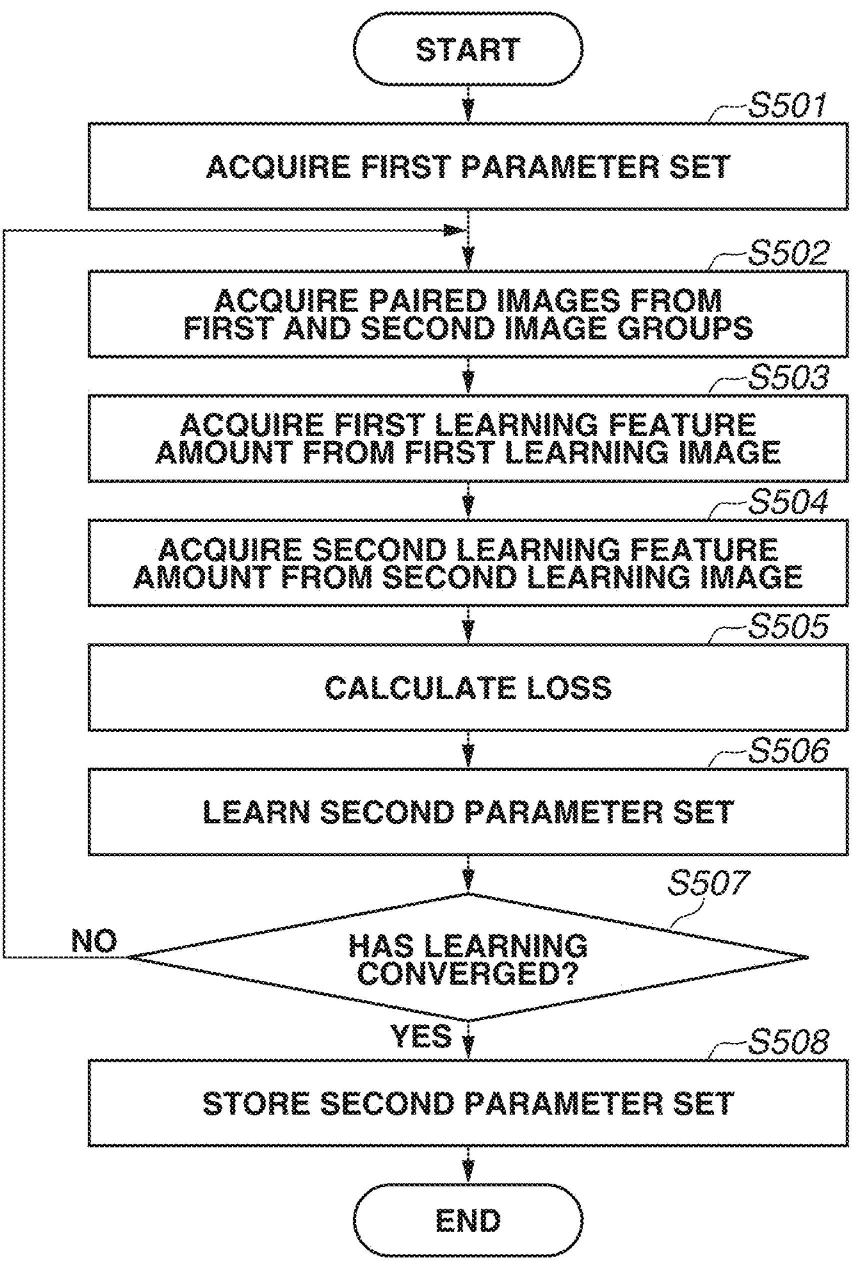
FIG. 8B is a flowchart illustrating a process that the image processing apparatus executes.
Figure 9A:
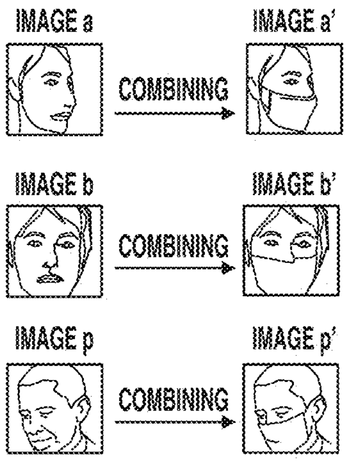
FIG. 9A is a schematic diagram illustrating an example of a learning process.

Another derivative embodiment of the learning form will be described below. For example, a learning form without using representative vectors is also possible. An example of an operation processing of the learning will be described below with reference to FIGS. 8A and 8B and schematic diagrams illustrated in FIGS. 9A to 9C. In this example form, a set of normal person images and an image group of images obtained by a mask image being superimposed and combined with the normal person images are used. FIG. 9A illustrates an example of images a, b, and p of normal persons and images a', b', and p' with a mask superimposed thereon. In this derivative example, the second parameter set is learned so that feature amounts of the images a', b', and p' become closer to feature amounts of the images a, b, and p.

Initially in the first learning processing, learning processing in accordance with the above-described method is performed using the normal person images in steps S401 to S407. Unlike the above-described method, a loss value is calculated from intra- and inter-class similarities using the following equation without using representative vectors, and the first parameter set for the first learning model is updated.

$$\text{Intra-class similarity score}(f_i)=\Sigma_{y(k)=y(i)}\text{similarity score}(f_i,f_k),$$

$$\text{Inter-class similarity score}(f_i)=\Sigma_{y(j)\neq y(-i)}\text{similarity score}(f_i,f_j),$$

$$\text{Loss value}=\Sigma_i\ \text{inter-class similarity score}(f_i)-\lambda\text{intra-class similarity score}(f_i). \quad \text{(Equations 4)}$$

Figure 9B:
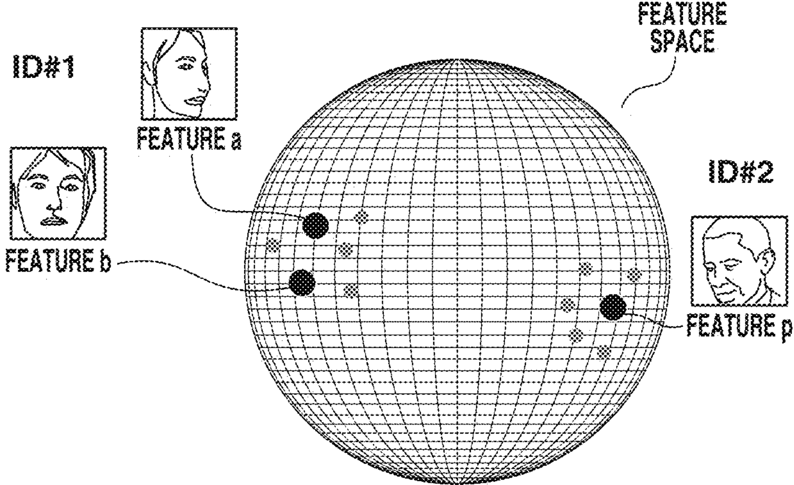
FIG. 9B is a schematic diagram illustrating an example of a learning process.

In the Equations 4, $f_i$ and $f_k$ are a pair of feature amounts of the same person, and $f_i$ and $f_j$ are a pair of feature amounts of different persons. A result of the first learning processing is illustrated in FIG. 9B.

Next, in the second learning processing, the second parameter set for the second learning model is learned. In step S501, the feature amount transformation unit 202 initializes the DNN parameters, and in step S502, the image acquisition unit 201 acquires, as learning images, a pair of an original image (first learning image) before a mask is superimposed and an image (second learning image) after a mask is superimposed and combined. In other words, the first learning image and the second learning image are images obtained by imaging the same object and are a pair of images which are different in object state and/or imaging environment. In steps S503 and S504, the feature amount transformation unit 202 acquires a first learning feature amount from the first learning model and the original image (first image) and acquires a learning feature amount from the second feature model and the combined image (second image). In step S505, the training unit 203 calculates intra- and inter-class loss values of the person. At this time, an image pair similarity is added as a new term as in the following equations in addition to the terms of the intra-class similarity score and the inter-class similarity score of the person that have been used.

$$\text{Image pair similarity score}(f_x)=\text{similarity score}(f_x,f_{x'}). \quad \text{(Equation 5)}$$

$$\text{Loss value}=\Sigma_i\ \text{inter-class similarity score}(f_i)-\lambda_1\ \text{intra-class similarity score}(f_i)-\lambda_2\text{image pair similarity score}(f_i). \quad \text{(Equation 6)}$$

In the foregoing Equations, $f_x$ is a feature amount of an image x, $f_{x'}$ is a feature amount of an image x' obtained by superimposing and combining a mask with the image x, and $\lambda_1$ and $\lambda_2$ are parameters for balance of the terms.

Figure 9C:
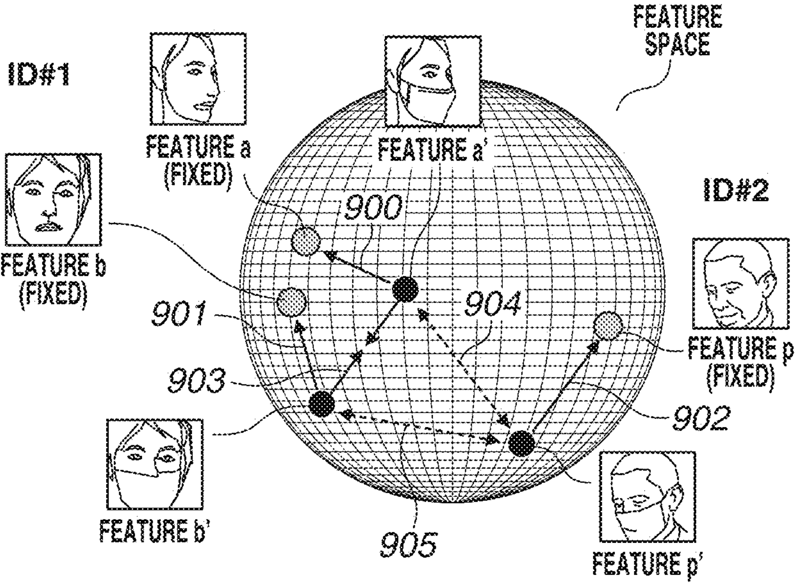
FIG. 9C is a schematic diagram illustrating an example of a learning process.

The term of the image pair similarity is learned so that the distances between the learning feature amounts of the original image (first learning image) before a mask is superimposed and the combined image (second learning image) after a mask is superimposed become smaller than a predetermined value. FIG. 9C is a schematic diagram illustrating the term of a feature amount pair similarity with arrows with reference numbers 900, 901, and 902 added thereto. In FIG. 9C, the arrow 903 indicates a conventional intra-class similarity, and the arrow 904 indicates an inter-class similarity. A plurality of similarities is thus combined to define a loss value, so that the verification accuracy is expected to improve. In step S506, the second parameter set for the second learning model is learned to reduce the loss value. Since the first learning model is not learned here, in the second learning processing, the feature amounts of the original images without a mask are "fixed" and unmoved, and learning is performed so that the feature amounts of the images combined with a mask are changed to be closer to the feature amounts without a mask. In step S507, if the training unit 203 determines that the learning has converged (YES in step S507), in step S508, the second parameter set of the second learning model is stored, and the learning is ended. The foregoing is the description of an example of a derivative embodiment of the learning method.

There are also other possible embodiments for the learning method. In one example, it is conceivable that the leaning of the feature amount transformation unit for normal persons in the first learning processing is performed with inclusion of several mask person images. It is expected that this process prevents a significant decrease in performance in a case where the object state determination unit 103 erroneously performs determination in the verification and incorrect feature amount transformation parameters are applied. Similarly, it is conceivable that the learning of mask-wearing persons made by the feature amount transformation unit is performed with inclusion of normal person images.

As described above, there are various possible embodiments of the learning processing. It is also possible to gradually apply the plurality of above-described learning processing methods based on the progress of the learning. As described above, processing for learning according to the present invention is not limited to a single example.

<Derivative Embodiment of Configuration of Feature Amount Transformation Unit>

Next, an example of a derivative embodiment of a DNN configuration will be described below. For example, the number of layers or neurons of the DNN for feature amount transformation to be used for normal persons can be differentiated from the number of layers or neurons of the DNN for mask-wearing persons. In general, use of a large-scale DNN often improves performance for a target that is difficult to verify, such as a person wearing a mask or a person facing sideway and for a target that has a wide variety of appearances. Thus, adjusting a scale of each DNN depending on a target improves the cost effectiveness for the calculation cost and the verification accuracy.

In another possible embodiment, the DNN of the feature amount transformation for normal persons and the DNN for mask-wearing persons can share the front layers, and only the back layers can be changed partially based on a state of a person.

In yet another embodiment, feature amount transformation units that differ completely from each other in configuration are useable as the feature amount transformation unit for normal persons and the feature amount transformation unit for mask-wearing persons. For example, a convolutional neural network is useable as the feature amount transformation unit for normal persons, and a known transformer network discussed in Patent Document 2 is useable for mask-wearing persons. Further, a recurrent neural network can be used. Not only the DNNs, but a wide variety of feature amount transformation means that is capable of adjusting parameters based on loss values is applicable.

In yet another derivative embodiment, the feature amounts $f_1$ and $f_2$ obtained by transforming an input image can be not one-dimensional vectors but an N-dimensional matrix. Further, while the feature vectors obtained from the first trained model and the second trained model are set to the same length according to the present exemplary embodiment, the lengths of the feature vectors may be different. In the case of using feature amounts differing from each other in length, a known method for calculating a similarity between vectors of varying lengths, such as earth mover's distance, is useable.

The foregoing is the description of the first exemplary embodiment.

Second Exemplary Embodiment

In the present exemplary embodiment, the present invention is applied to an embodiment other than that in which switching is performed based on the presence or absence of a mask and/or sunglasses. According to the first exemplary embodiment, images are input on a one-to-one basis, and whether subjects are the same object is determined. In the present exemplary embodiment, an example of an embodiment intended for a use case, such as a case with a gate of an automatic door that opens or closes based on face recognition, will be described below. In an image processing apparatus according to the present exemplary embodiment, feature amounts of N persons are registered in advance. At the time of verification, a single image captured by a camera in front of the gate is input as an input image, and whether a person in the input image matches any one of the registered N persons or does not match any one of the registered N persons is determined.

In the first exemplary embodiment, whether a mask is present or absent is determined, and the feature amount transformation units are switched. In the present exemplary embodiment, face images for registration (frontal faces with suitable illumination conditions) and face images for inquiry (poor illumination conditions due to camera installation situations, averted face direction with a large angle, etc.) differ significantly from each other in imaging conditions. Thus, different feature amount transformation units for different imaging conditions are learned and used.

Figure 10:
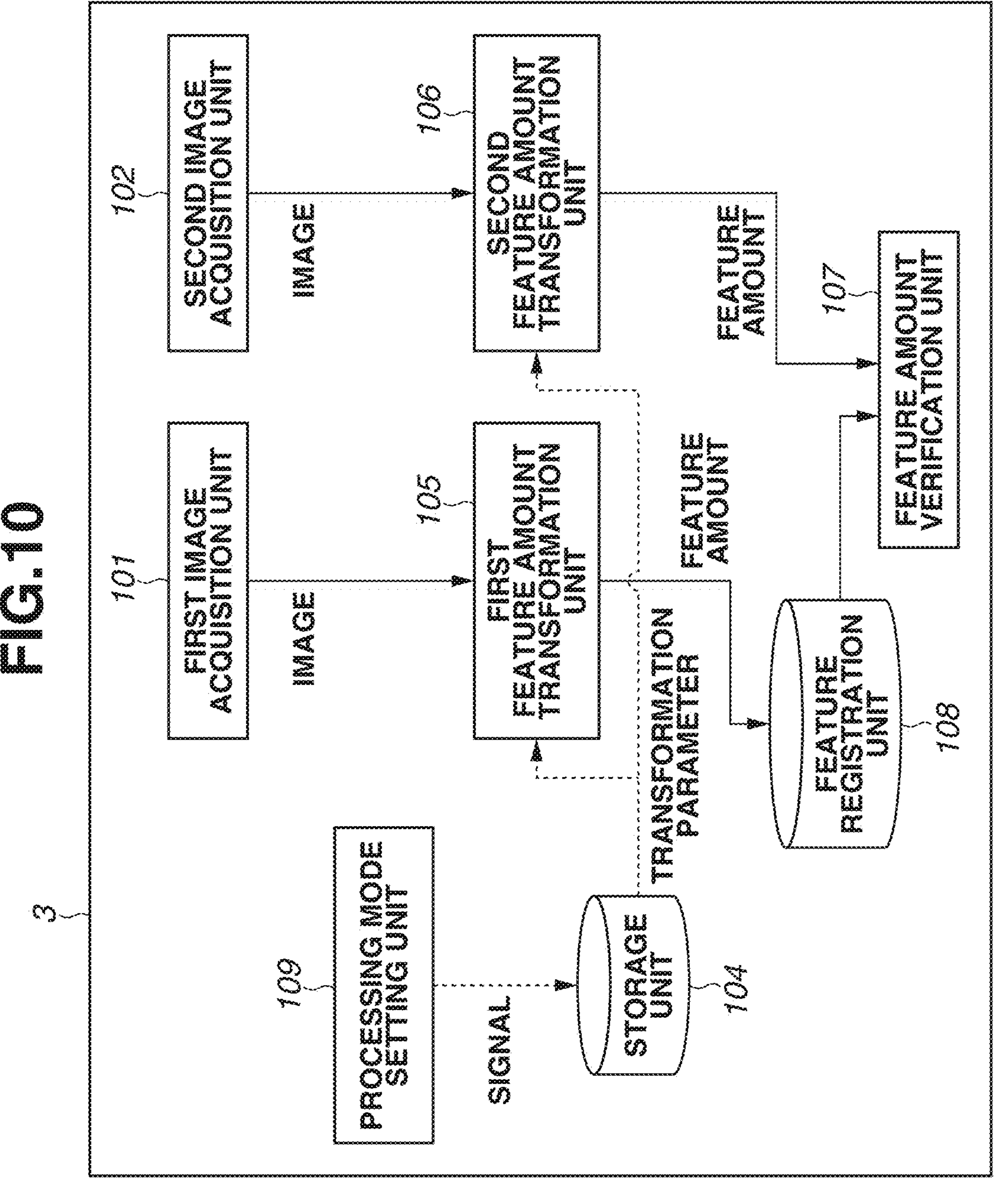
FIG. 10 is a block diagram illustrating an example of a functional configuration of an image processing apparatus.
Figure 11A:
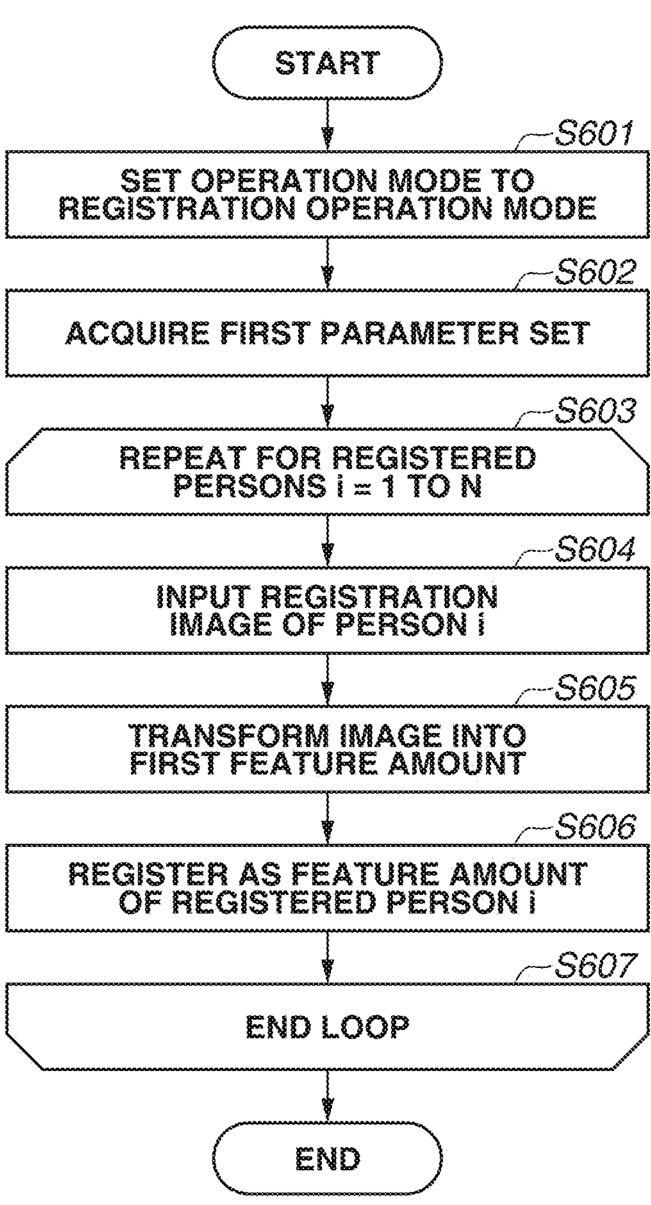
FIG. 11A is a flowchart illustrating a process that the image processing apparatus executes.
Figure 11B:
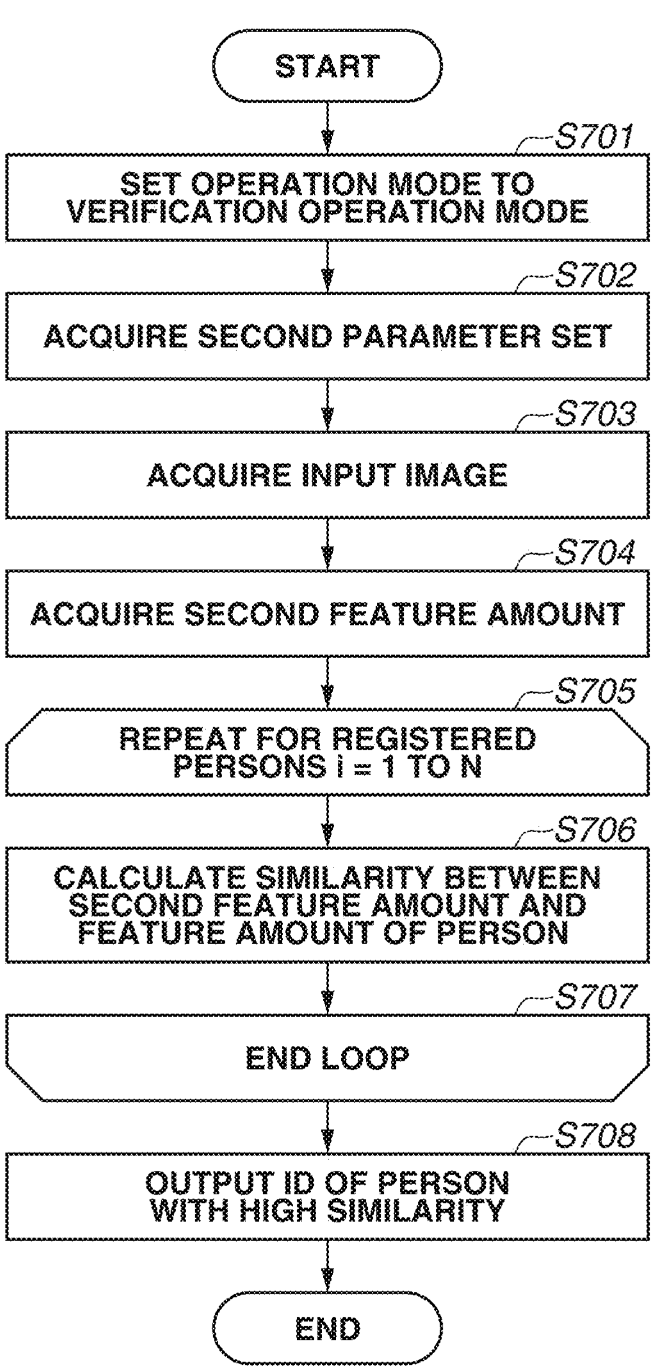
FIG. 11B is a flowchart illustrating a process that the image processing apparatus executes.

FIG. 10 illustrates an example of a functional configuration of an image processing apparatus 3. A basic configuration corresponds to that in FIG. 1. A difference is that a feature registration unit 108 and a processinging mode setting unit 109 are further included. FIGS. 11A and 11B illustrate a verification processing. FIG. 11A illustrates an operation of registering persons, and FIG. 11B illustrates an operation of verifying an input image with respect to the registered persons.

In step S601, if the image processing apparatus 3 starts the registration operation, the processinging mode setting unit 109 sets a current operation mode to a registration operation mode. In step S602, the first feature amount transformation unit 105 acquires a transformation parameter set (first parameter set) for the registration operation mode. The acquired parameter set is applied to a trained model. Next, in step S604, the first image acquisition unit 101 inputs a person image for registration for each one of the N persons, and in step S605, the feature amount transformation unit 105 transforms each input image into a feature amount and registers each feature amount as a feature amount of the corresponding person in the feature registration unit 108. Registration images are intended to be images of frontal faces of persons imaged in suitable conditions. Thus, the first feature amount transformation unit is trained in advance using mainly frontal faces.

Next, in step S701, if the image processing apparatus starts the verification operation, the processinging mode setting unit 109 sets the operation mode to a verification operation mode. Initially in step S702, the second feature amount transformation unit 106 acquires a parameter set (second parameter set) selected from the plurality of trained parameter sets based on the situation. The second parameter set is learned in advance using persons of various angles as training data.

In step S703, the second image acquisition unit 102 acquires a single input captured image. Where a person is in the image is not predetermined depending on the positional relationship between the camera and the gate door. Thus, the second image acquisition unit 102 can include therein a face detection device to detect a face, and an image around the face can be cut off (a face detection device that is widely and publicly known may be used). Next in step S704, the second feature amount transformation unit 106 acquires a second feature amount from the input image. In steps S705 to S707, the feature amount verification unit 107 calculates similarities between the feature amounts of the input image and the registered feature amounts one by one in step S706, and if there is a candidate person with a similarity higher than or equal to a predetermined value, the result is output in step S708. While not illustrated in the processing, an operation of opening or closing the gate door is performed based on the result in real use cases. More specifically, if a person in the second image matches any of the registered persons, control is performed to open the gate, whereas if none of the registered persons match, the gate is not opened, and a notification is output to an administrator as needed. The recognition result may be output to a display apparatus near an entrance gate.

Figure 12:
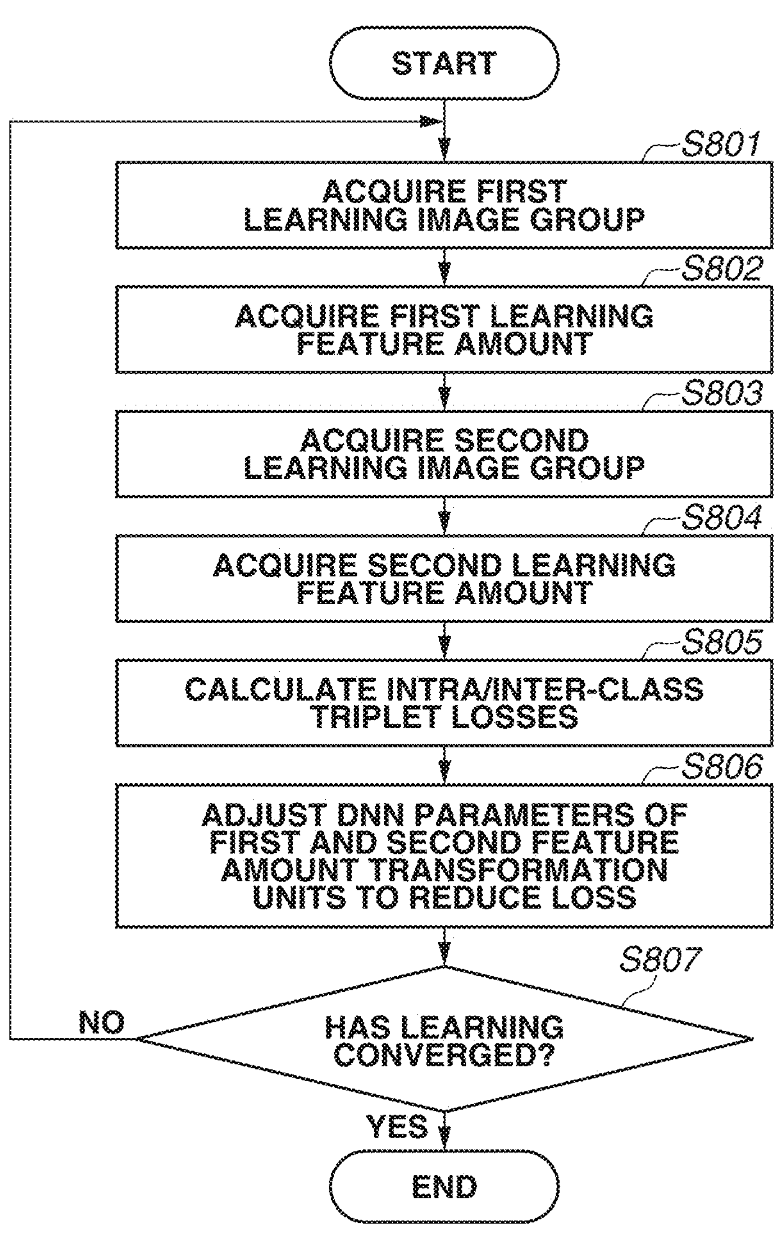
FIG. 12 is a flowchart illustrating a process that the image processing apparatus executes.
Figure 13:
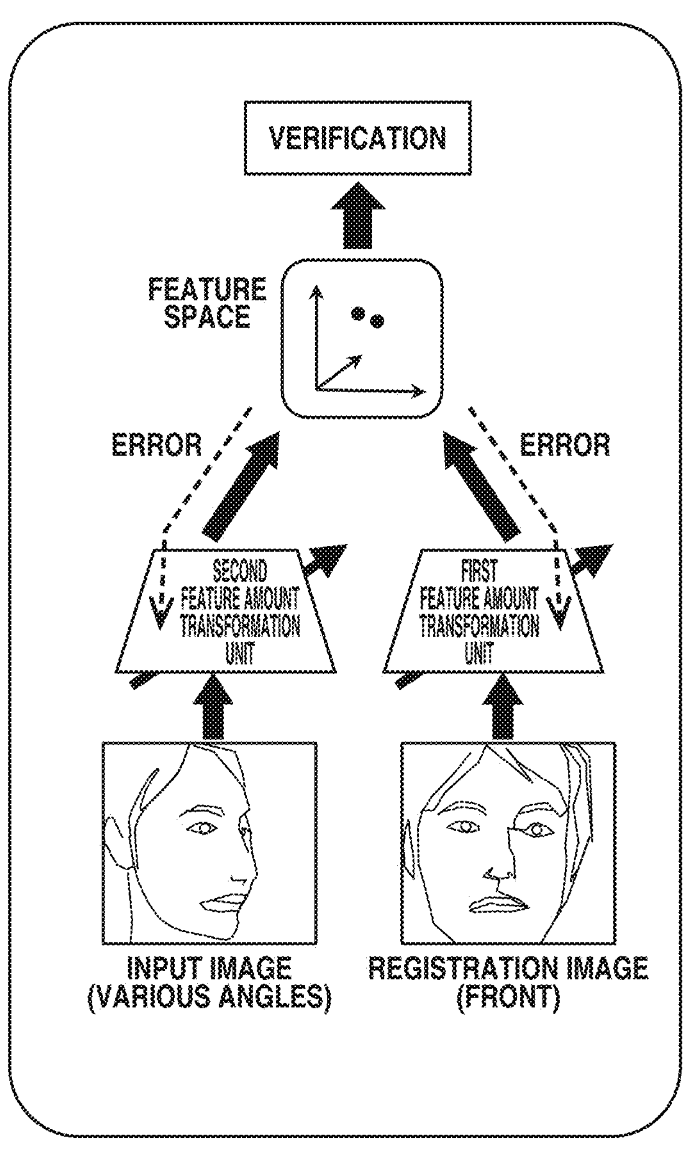
FIG. 13 is a schematic diagram illustrating an example of operations of a learning process.

FIG. 12 is a learning processing according to the second exemplary embodiment. A schematic diagram is illustrated in FIG. 13. A difference from the first exemplary embodiment is that the first learning model and the second learning model are trained simultaneously. The learning method according to the present exemplary embodiment is also applicable to the foregoing method, and this will be described below. An example of a hardware configuration is similar to that in in FIG. 2, and an example of a functional configuration of the image processing apparatus is similar to that in FIG. 14.

In step S801 in FIG. 12, the image acquisition unit 201 acquires first learning image group that is a set of only front images with simulated imaging condition of the registration images. In step S802, the feature amount transformation unit 202 acquires a first learning feature amount from the first learning image group based on the first learning model using the first parameter set. In step S803, the image acquisition unit 201 acquires second learning image group. The second image group includes various person images with different angles including an overhead image which is intended for input images. In step S804, the feature amount transformation unit 202 acquires a second learning feature amount from the second learning image group based on the second learning model using the second parameter set.

In step S805, the training unit 203 randomly selects an image from each image group, generates a pair of images of a target person (intra-class pair) and a pair of images of different persons (inter-class pair), and calculates a loss value based on similarities between feature amounts of the images. In loss calculation, a known triplet loss discussed in Non-patent Document 2 and the like is used as described below (Non-patent Document 2: Florian Schroff, Dmitry Kalenichenko, and James Philbin. Facenet: A unified embedding for face recognition and clustering. In CVPR, 2015).

$$\text{Loss value}=\Sigma_i[\text{inter-class pair similarity score}(f_i,f_j)-\text{intra-class pair similarity score}(f_i,f_k)+m]^+, \quad \text{(Equation 7)}$$

where m is a constant of a loss margin value for robust learning, and $[\cdot]^+$ is a function defined by:

$$[x]^+=x \text{ if } x>0, \text{ or}$$

$$[x]^+=0 \text{ otherwise.} \quad \text{(Equation 8)}$$

In the foregoing formula, $f_i$ is a feature amount of the person image $I_i$, $f_j$ is a feature amount of a person different from the image $I_i$, and $f_k$ is a feature amount of another image $I_k$ of the same person as $I_i$.

The person image $I_i$ is randomly selected from the first learning set or the second learning set, and the person images $I_j$ and $I_k$ are sampled based on the selected person image $I_i$ to form an inter-class pair and an intra-class pair. At this time, if the person image $I_i$ is selected from the first learning set, the person images $I_j$ and $I_k$ are selected from the second learning set, whereas if the person image $I_i$ is selected from the second learning set, the person images $I_j$ and $I_k$ are selected from the first learning set. This makes it possible to train the first learning model and the second learning model in a ganged manner.

In step S806, the training unit 203 performs parameter learning and update using the error back-propagation method to reduce the loss values of the first learning model and the second learning model. As a result, as illustrated in the schematic diagram in FIG. 13, a loss value is calculated based on a similarity between outputs of the two learning models, and the calculated loss value is back-propagated as an error to the feature transformation units to perform parameter learning and update.

The description has been provided of an example where the first learning model and the second learning model simultaneously perform learning while the first learning model and the second learning model process images of different characteristics. As a derivative method, it is possible that the two learning models are simultaneously trained in an initial stage, and only the second feature amount is learned in the latter half with the first feature amount fixed.

Third Exemplary Embodiment

According to the above-described exemplary embodiments, both the state determination and the feature amount transformation each obtain states and feature amounts from images. A description will be provided of the present exemplary embodiment in which intermediate feature amounts are generated from images and the state determination and the feature amount transformation are performed using the intermediate feature amounts. The term "state" here includes attributes of a person, such as gender, race, and age. According to the present exemplary embodiment, some of the parameters for the learning model are changed based on an attribute of a person in an image in acquiring a feature amount for identifying the person. Meanwhile, common layers of the learning models that perform the processing of determining an attribute (state) of a person and the processing of feature amount transformation are used. This standardizes the processing of state determination and the processing of feature amount transformation to increase speed and memory efficiency.

In the present exemplary embodiment, a description will be provided, with reference to FIGS. 15 to 18, of a case of "one-to-one image verification processing" in which images in a one-to-one relationship are set as input images as in the first exemplary embodiment and whether subjects are the same object is determined. Next, a description will be provided of a case of "one-to-N image verification processing" through which any one of the N persons registered in advance matches a person in an input image, with reference to FIGS. 19, 20A, and 20B. A hardware configuration is similar to that of the information processing apparatus in FIG. 2 according to the first and second exemplary embodiments.

<One-to-One Image Verification Processing>

Figure 15:
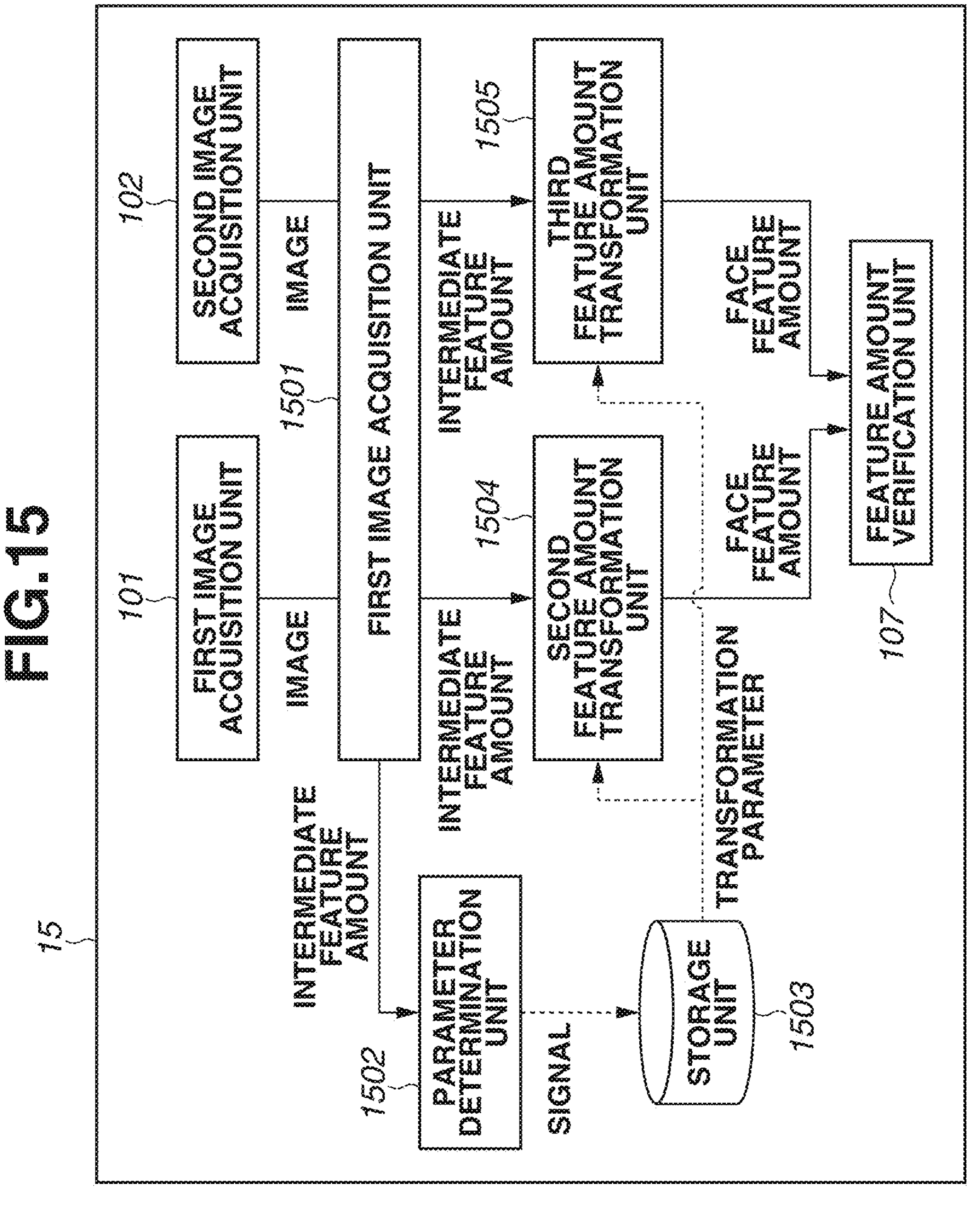
FIG. 15 is a block diagram illustrating an example of a functional configuration of an image processing apparatus.

FIG. 15 illustrates an example of a functional configuration of an image processing apparatus 15. A basic configuration corresponds to that in FIG. 1. A difference is that a first feature amount transformation unit 1501 generates intermediate feature amounts. With this, a parameter determination unit 1502, a second feature amount transformation unit 1504, and a third feature amount transformation unit 1505 (third feature acquisition unit) operate based on the intermediate feature amounts. The parameter determination unit 1502 selects a parameter of a trained model based on a state (or an attribute in the case of a person) of an object in an image. The parameter selection unit 1502 estimates the state of the object in the image based on the intermediate feature amount of the image. As to an estimation method, an attribute is determined to an attribute of interest if a matching level with a representative feature amount of the attribute of interest is higher than or equal to a predetermined threshold. Alternatively, a state of an object in an image is estimated based on a third trained model that outputs feature amounts relating to states of objects from images. Furthermore, the parameter determination unit 1502 selects transformation parameters for which correspondences have been established in advance based on the estimated state (the attribute of the person). In other words, if an attribute of an object in a first image and an attribute of an object in a second image are the same, the same trained model (or feature transformation parameter) is determined. If the attribute of the object in the first image and the attribute of the object in the second image are different, different trained models (or model parameters) are determined. Further, a storage unit 1503 stores transformation parameters to be provided to the second feature amount transformation unit 1504 and the third feature amount transformation unit 1505.

FIG. 16 is a schematic diagram illustrating a verification processing according to the present exemplary embodiment. The first feature amount transformation unit 1501 transforms an input image into an intermediate feature amount relating to an object state. The parameter determination unit 1502 determines a transformation parameter corresponding to the state, using the transformed intermediate feature amount. The object states include, but are not limited to, gender, race, age, face orientation, and the presence or absence of a mask being worn. The storage unit 1503 stores a transformation parameter 1602 specialized for state Y and a predetermined transformation parameter 1601 for all conditions. For example, if a determined state for an input image is "state Y", the transformation parameter 1602 for state Y is set in the third feature amount transformation unit 1505. If a target object does not correspond to any specific learned state, a predetermined parameter may be provided as a dummy. The third feature amount transformation unit 1505 then transforms the intermediate feature amount into a face feature amount based on the parameters determined by the parameter determination unit 1502. While the term "feature amount" is used in the above-described exemplary embodiments, the term "face feature amount" is used to enable clear distinction from the intermediate feature amounts. Next, a registration image is transformed into a face feature amount, and the feature amount verification unit 107 verifies the face feature amounts of the input image and the registration images.

Figure 21:
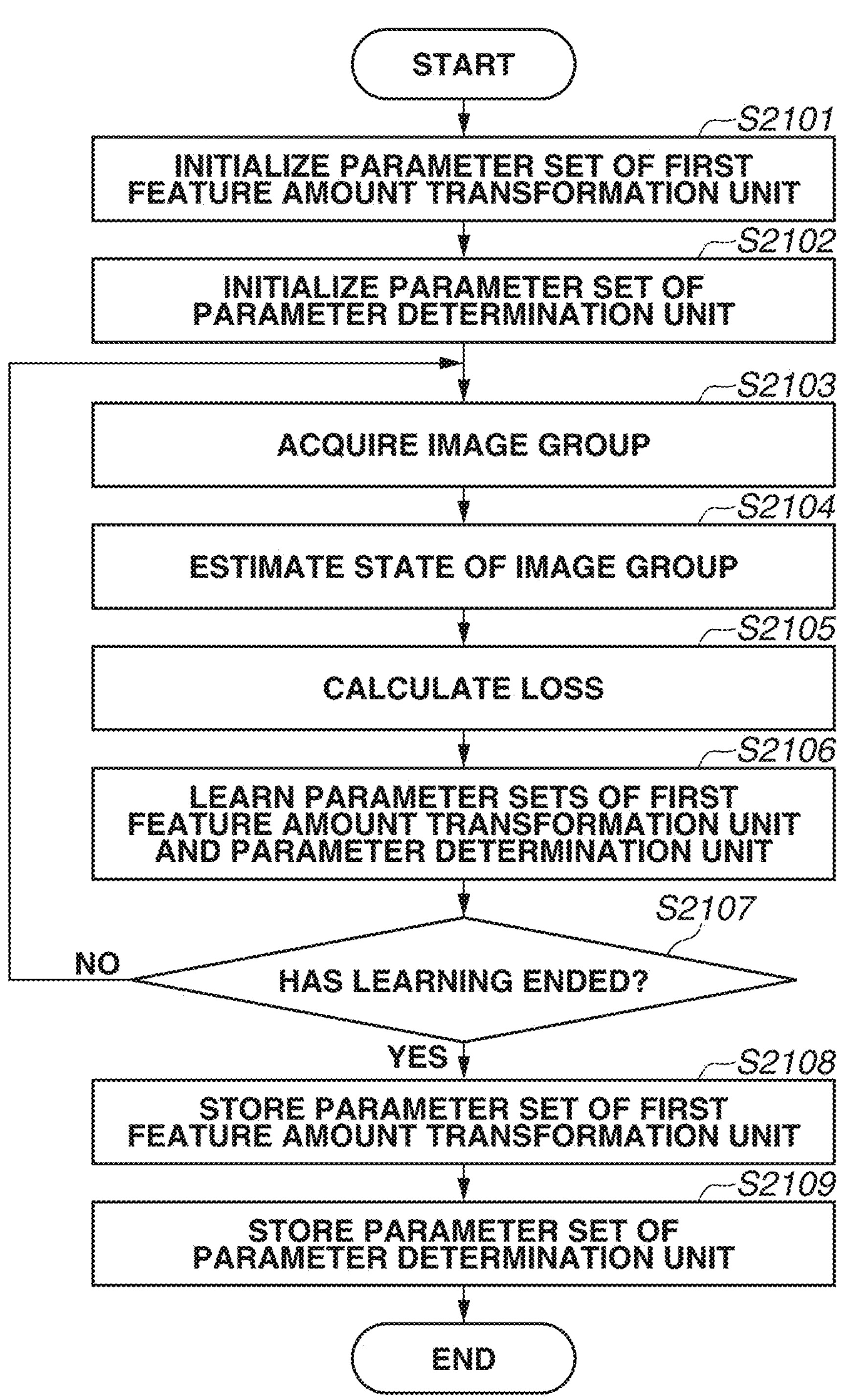
FIG. 21 is a flowchart illustrating a process that the image processing apparatus executes.

This operation provides commonality of parts to be transformed into intermediate feature amounts, the processing speed increases. Furthermore, the parameter determination unit and the models of the second and third feature transformation units are decreased in size. In addition, as a result of the decrease in model size, the size of the transformation parameters managed by the storage unit 1503 also decreases, and the transformation parameters can be read at high speed. According to the first exemplary embodiment, the parameter determination unit 1502 obtains an object state (whether a mask is worn) using a method such as template matching. The parameter determination unit 1502 may be constructed using a deep neural network, as in the second and third feature transformation units. Similarly, the first feature amount transformation unit may be constructed as a deep neural network. A specific state determination method will be described below with reference to FIG. 21.

Thus, the transformation parameters specialized for a specific state are held, so that robust verification with respect to changes in state is realized. Furthermore, even in a case where the state determination fails, since all the transformation parameters share the feature space, the feature amount transformation does not significantly fail. Thus, robust verification is realized also with respect to the performance of the state determination. Further, to improve the characteristics, each transformation parameter may be learned so that the feature amount transformation for images other than the supported states can also be supported to some extent. For example, leaning may be performed with training data including some images of other states in addition to images of the supported states. Alternatively, learning may be performed while the loss function is changed to, for example, reduce the loss value in the case of other states.

Next, a verification processing will be described below with reference to FIG. 17. In this processing, images are input on a one-to-one basis, and whether subjects are the same object is determined. In this example, a state that the parameter determination unit 1502 obtains is "gender".

In step S1701, the first image acquisition unit 101 acquires a first image (first image) including a person.

In step S1702, the first feature amount transformation unit 1501 transforms the first image into an intermediate feature amount (first intermediate feature amount).

In step S1703, the parameter determination unit 1502 determines a state (first state) of the first image based on the first intermediate feature amount. More specifically, whether the gender of the person in the first image is male (not female) is determined.

In step S1704, the parameter determination unit 1502 reads the transformation parameters corresponding to the first state from the storage unit 1503 based on the determination result and sets the read transformation parameters to the second feature amount transformation unit 1504.

In step S1705, the second feature amount transformation unit 1504 transforms the first intermediate feature amount and obtains a face feature amount (first face feature amount). If the first state is male as a result of the determination made in step S1703, the second feature amount transformation unit 1504 acquires a feature from the image based on a trained model in which parameters proficient at identifying male are set.

In step S1706, the second image acquisition unit 102 acquires a second image (second image) including a person.

In step S1707, the first feature amount transformation unit 1501 transforms the second image into an intermediate feature amount (second intermediate feature amount).

In step S1708, the parameter determination unit 1502 determines a state (second state) of the second image based on the second intermediate feature amount. More specifically, whether the gender of the person in the second image is male (not female) is determined.

In step S1709, the transformation parameters corresponding to the second state are read from the storage unit 1503, and the read transformation parameters are set in the third feature amount transformation unit 1505.

In step S1710, the third feature amount transformation unit 1505 transforms the second intermediate feature amount and obtains a face feature amount (second face feature amount). Here, if the first image and the second image are both male images, the parameters of the trained models set in the second feature amount transformation unit 1504 and the third feature amount transformation unit 1505 are the same. On the other hand, if, for example, the first image is a male image and the second image is a female image, the parameters for the trained models set in the second feature transformation unit 1504 and the third feature transformation unit 1505 are different.

In step S1711, the feature amount verification unit 107 calculates a similarity score between the two feature amounts acquired in steps S1705 and S1710. Through threshold processing performed on the similarity score, whether the persons in the two images are the same can be determined.

Next, a verification processing different from the verification processing in FIG. 17 will be described below with reference to FIG. 18. In a case where a state that the parameter determination unit 1502 determines is race or gender, if the states of persons are different, the persons are determined to be different persons. In this processing, states of two images are acquired in advance, and if a certainty factor of a result of determination for the states of objects in the images is high and the states are determined to be different, the processing of transformation into a face feature amount is skipped. This reduces processing. Further, if the states of the two images are determined to be the same, the transformation parameter reading can be consolidated into a single operation to reduce processing.

The operations in steps S1801 to S1803 in FIG. 18 correspond to those in steps S1701 to S1703 in FIG. 17, and the first feature amount transformation unit 1501 transforms the first image into an intermediate feature amount and obtains a state (first state) for the first image. In steps S1804 to S1806, the first feature amount transformation unit 1501 transforms the second image into an intermediate feature amount and obtains a state (second state) of the second image, as in steps S1706 to S1708.

In step S1807, the parameter determination unit 1502 determines whether the first state and the second state that are obtained in steps S1803 and S1806 are the same. If the first state and the second state are the same (YES in step S1807), the processing proceeds to step S1808. Otherwise (NO in step S1807), the processing proceeds to step S1812.

In step S1808, the parameter determination unit 1502 reads a transformation parameter corresponding to the first state from the storage unit 1503 and sets the read transformation parameter in the second feature amount transformation unit 1504 and the third feature amount transformation unit 1505.

In step S1809, the second feature amount transformation unit 1504 transforms the first intermediate feature amount into a face feature amount (first face feature amount).

In step S1810, the third feature amount transformation unit 1505 transforms the second intermediate feature amount into a face feature amount (second face feature amount).

In step S1811, the feature amount verification unit 107 calculates a similarity score between the first face feature amount and the second face feature amount.

In step S1812, whether a score for the state (state score) output by the parameter determination unit 1502 is high is determined. To that end, the parameter determination unit 1502 is configured to output a score together with a state. For example, the parameter determination unit 1502 is configured as a deep neural network to obtain an output for each state. Learning is then performed to maximize an output corresponding to a state of an image. The state determination may be determined to obtain a state in which an output is maximum, and the output value may be used as a state score. A specific method for determining a state score will be described below with reference to FIG. 21. If the state score is higher than a predefined threshold, the processing proceeds to step S1813. Otherwise (NO in step S1812), the processing proceeds to step S1814.

In step S1813, the feature amount verification unit 107 outputs zero as the similarity between the first image and the second image. In other words, if a certainty factor of the state determination is higher than or equal to a predetermined value and the states of the objects (the attributes of the persons) are different, it is determined that the possibility that the objects are the same is low.

In step S1814, the parameter determination unit 1502 reads a transformation parameter corresponding to the first state from the storage unit 1503 and sets the read transformation parameter in the second feature amount transformation unit 1504.

In step S1815, the second feature amount transformation unit 1504 transforms the first intermediate feature amount and obtains a face feature amount (first face feature amount).

In step S1816, the transformation parameters corresponding to the second state are read from the storage unit 1503, and the read transformation parameters are set in the third feature amount transformation unit 1505.

In step S1817, the third feature amount transformation unit 1505 transforms the second intermediate feature amount and obtains a face feature amount (second face feature amount).

In step S1818, the feature amount verification unit 107 calculates a similarity score between the two feature amounts obtained in steps S1815 and S1817. As in the above-described exemplary embodiments, if the similarity score is higher than or equal to a predetermined threshold, the two objects are determined to be the same, whereas if the similarity score is lower than the threshold, the two objects are determined to be different.

<One-to-N Image Verification Processing>

Figure 20A:
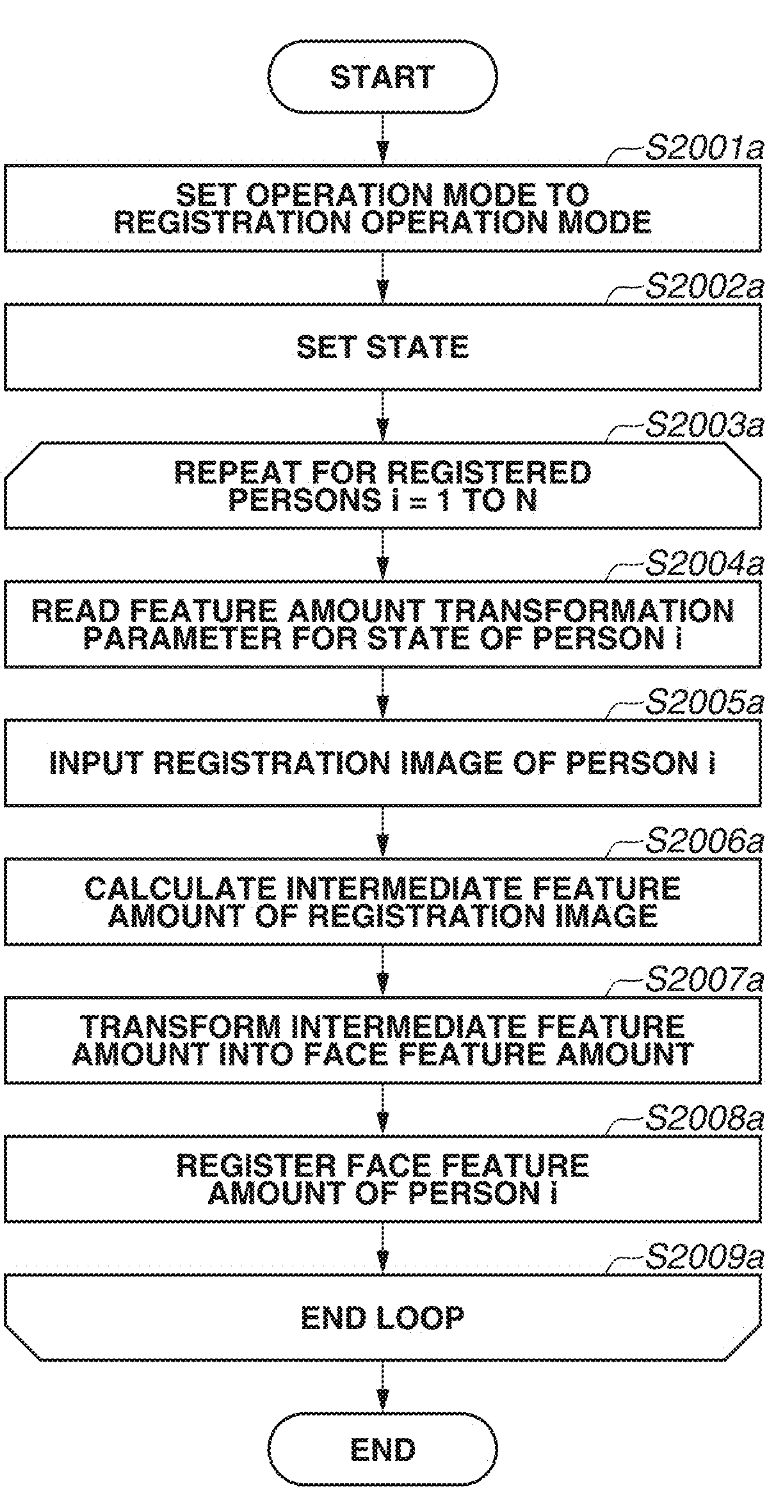
FIG. 20A is a flowchart illustrating a process that the image processing apparatus executes.

FIG. 19 illustrates an example of a functional configuration of an image processing apparatus 19. A basic configuration corresponds to that in FIG. 15. A difference is the inclusion of a processing mode setting unit 1901 and a feature amount registration unit 1902. FIGS. 20A and 20B illustrate a verification processing. FIG. 20A illustrates an operation of registering persons, and FIG. 20B illustrates an operation of verifying an input image with respect to the registered persons.

In the registration operation, the parameter determination unit 1502 determines transformation parameters corresponding to a state of a race of a registered person that is acquired in advance. The race of the registered person can be correctly identified at the time of registration, so that the race does not have to be estimated from the image. A specific processing will be described below with reference to FIG. 20A.

In step S2001*a*, the processing mode setting unit 109 sets the current operation mode to the registration operation mode.

In step S2002*a*, the processing mode setting unit 109 acquires a state of a race of each registered person. For example, a list of states of races of the registered persons is stored in advance in the storage unit H104 such as a hard disk drive (HDD), and the list is acquired. Alternatively, a state of a race of each person to be registered is acquired from the acquisition unit H105, such as a keyboard.

In step S2003*a*, a loop for sequentially processing the registered persons starts. The registered persons are numbered sequentially starting with 1. In order to refer to each registered person using a variable i, initially, i is initialized to 1. Furthermore, if i is less than or equal to the number of registered persons, the processing proceeds to step S2005*a*, and if this is not satisfied, the processing exits the loop and is ended.

In step S2004*a*, the parameter determination unit 1502 reads the corresponding transformation parameters from the storage unit 1503 based on the state of the person i acquired by the processing mode setting unit 109 and sets the read transformation parameters in the second feature amount transformation unit 1504.

In step S2005*a*, the first image acquisition unit 101 acquires a registration image of the person i.

In step S2006*a*, the first feature amount transformation unit 1501 transforms the registration image into an intermediate feature amount.

In step S2007*a*, the second feature amount transformation unit 1504 transforms the intermediate feature amount and obtains a face feature amount.

In step S2008*a*, the face feature amount is registered as a face feature amount of the person i in the feature registration unit 1902. Additionally, the state of the race of the person i is also registered.

In step S2009*a*, the loop of the registered persons ends, and one is added to i. Then, the processing returns to step S2003*a*.

Next, an operation of verifying the input image and the registered persons will be described below with reference to FIG. 20B. Since the state, such as race of the input image, is unknown at the time of the verification operation, the processing is performed based on a state estimated from the image. Further, in a case where the states are race or gender, persons are determined to be different persons if the states of the persons are different. Thus, in a case where a state, such as race of a person in an input image, is estimated with a high certainty factor, the registered persons to be verified are narrowed down to increase processing speed. A specific processing will be described below with reference to FIG. 20B. In this example, a state that the parameter determination unit 1502 determines is "race".

In step S2001*b*, the processing mode setting unit 109 sets the operation mode to the verification operation mode. Thus, states are no longer acquired from the processing mode setting unit 109.

In step S2002*b*, the second image acquisition unit 102 acquires an inquiry image (second image).

In step S2003*b*, the first feature amount transformation unit 1501 transforms the second image into an intermediate feature amount (second intermediate feature amount).

In step S2004*b*, the parameter determination unit 1502 determines a state (second state) for the second image from the second intermediate feature amount. More specifically, the race of the person in the second image is determined.

In step S2005*b*, the parameter determination unit 1502 determines, based on the second state, the transformation parameters corresponding to the second state from the storage unit 1503. The determined transformation parameters are set in a (third) trained model in the third feature amount transformation unit 1505.

In step S2006*b*, the third feature amount transformation unit 1505 transforms the second intermediate feature amount and obtains a face feature amount (second face feature amount).

In step S2007*b*, whether the score of the state (state score) output by the parameter determination unit 1502 is high is determined. If the state score is higher than the predefined threshold, the processing proceeds to step S2008*b*. Otherwise (NO in step S2007*b*), the processing proceeds to step S2009*b*.

In step S2008*b*, the feature amount verification unit 107 narrows down, as candidate persons, the registered persons of the same state as the second state. In other words, in the present exemplary embodiment, the registered persons are narrowed down to the registered persons of the same race.

In step S2009*b*, a loop for sequentially processing the registered persons starts. In a case where the registered persons are narrowed down in step S2008*b*, the feature amount verification unit 107 sequentially performs verification process on the narrowed-down registered persons. Thus, to refer to the registered persons sequentially using the variable i, the processing target registered persons are initially numbered sequentially starting with 1, and i is initialized to 1. Furthermore, if i is smaller than or equal to the number of processing target registered persons, the processing proceeds to step S2010*b*, and if this is not satisfied, the processing exits the loop and proceeds to step S2012*b*.

In step S2010*b*, the feature amount verification unit 107 obtains the face feature amount of the person i that is stored in the feature registration unit 1902. The feature amount verification unit 107 then calculates a similarity score between the second face feature amount obtained in step S2006*b* and the face feature amount of the person i.

In step S2011*b*, the loop of the registered persons ends, and one is added to i. The processing then returns to step S2009*b*.

In step S2012*b*, if a person with the similarity score calculated in step S2010*b* is higher than or equal to a predetermined value is present, an output unit 1900 outputs a result thereof. The output unit 1900 outputs a result of the verification made by the feature amount verification unit 107, that is, face recognition result, to a display apparatus.

<Example of State Determination Method>

A method for determining a state from an image using the first feature amount transformation unit 1501 and the parameter determination unit 1502 will be described below. The first feature amount transformation unit 1501 and the parameter determination unit 1502 are configured using the DNN described above. The parameter determination unit 1502 is configured so that the number of outputs of the neural network is the same as the number of states and that outputs are obtained through a Softmax function.

Next, learning is performed so that a state is obtainable from an image. According to the present exemplary embodiment, a state label is associated with each dimension of the outputs of the Softmax function of the parameter determination unit 1502, and learning is performed so that the state corresponding to the image takes one while the other states take zero. A learning flow will be described below with reference to FIG. 21.

In step S2101, a parameter set for use in the first feature amount transformation unit 1501 is initialized using random numbers. Alternatively, the initialization can be performed using a parameter set obtained by learning face recognition using the method illustrated in FIG. 5A.

In step S2102, a parameter set for use in the parameter determination unit 1502 is initialized using random numbers.

In step S2103, a face image group with a state label assigned is acquired. For example, in a case where a condition relating to the state is race, the face image group with a race label assigned is acquired.

In step S2104, the parameter determination unit 1502 estimates the state labels. The values of the Softmax function are obtained by performing forward processing on the DNN using the images as input.

In step S2015, a loss is calculated based on formula 9 known as cross entropy.

$$\text{Loss value}=-/\Sigma p(i)\log(q(i)). \quad \text{(Equation 9)}$$

Here, p(i) represents information about a correct label that takes one in a case where the i-th state value is correct or takes zero in the other cases, and q(i) represents the value of the Softmax function that corresponds to the i-th state.

In step S2106, the parameter sets of the first feature amount transformation unit 1501 and the parameter determination unit 1502 are updated to reduce the loss value. Use of the error back-propagation method which is common in the DNN, the gradual-updating is performed to reduce the loss value.

In step S2107, whether the learning has ended is determined. For example, if the decrease in the loss value becomes small, it is determined that the learning has ended. Alternatively, it may be determined that the learning has ended if the learning has been repeated a predetermined number of times. If the learning has ended, the processing proceeds to step S2108. Otherwise, the processing returns to step S2103.

In step S2108, the parameter set of the first feature amount transformation unit 1501 is stored.

In step S2109, the parameter set of the parameter determination unit 1502 is stored.

Use of the parameter sets of the first feature amount transformation unit 1501 and the parameter determination unit 1502 that are obtained through the foregoing processing, the states with respect to the images can be obtained. More specifically, the value of the Softmax function with respect to the image is obtained and is determined to match a state corresponding to a dimension that takes the greatest value. The value of the Softmax function that is obtained here increases as the certainty factor increases. Thus, the value of the Softmax function may be used as a state score.

The foregoing processes provides commonality of operations from the state determination to the calculation of intermediate feature amounts through feature amount transformation, so that processing speed is increased. In addition, the state determination and the feature amount transformation are reduced in model size, and memory usage is reduced. Furthermore, the transformation parameters that the storage unit 1503 manages are reduced, so that the speed of reading transformation parameters increases.

In addition, in a case where a difference in state including, for example, race and/or age matches a difference in person and where it is determined with a high certainty factor that states differ from each other, the feature amount transformation is skipped, and the similarity is estimated to be low. This leads to an increase in processing speed. The estimation of the similarity to be low based on a difference in state is also applicable to a case in which no commonality of the operations from the state determination to the calculation of intermediate feature amounts through feature amount transformation is provided. In other words, it is also applicable to a case where the state determination and the feature amount transformation are performed both using images as input, as in the first and second exemplary embodiments. Furthermore, an attribute that is less likely to change over the course of a life of a person is to be set as a state. If an operation period is short, an attribute of an appearance, such as age, presence/absence of a beard, and hairstyle, may be used. Further, an alternative attribute of skin color may be used instead of race. Thus, states for use are not limited to race and gender.

Other Derivative Embodiments

While the present specification mainly describes the verification of persons, the present invention is applicable to various tasks relating to identity verification and similarity calculation. For example, the present invention is applicable to a task of detecting an object of a specific category, an image inquiry task of extracting a design of a specific shape from a moving image, and a task of searching for a similar image.

The states that the object state determination unit 103 or the processing mode setting unit 109 determines include image quality of an input image, object appearance angle, object size, clarity of object appearance, illumination brightness/darkness, object occlusion, presence/absence of an attachment and/or an accouterment of the object, a sub-type of the object, and a combination thereof.

Further, while two types of parameters are selectively used based on an object state, there is also other possible embodiments in which three or more types are used selectively.

Further, while examples of image recognition according to the exemplary embodiments are mainly described above, the verification or similarity search of not only images but also information, such as audio signals and music, are also possible. Applications to tasks of verifying or searching for documents that are similar in meaning to text information such as books, logs of social networking services (SNS), or reports are also possible using a method for transforming text into feature amounts as discussed in Patent Document 2. Since there are vocabularies and formats that are specific to each category such as books or SNS, performance may be enhanced by selectively using different feature amount transformation units for different categories of documents.

Further, while the verification as to whether objects are the same is mainly described above in the exemplary embodiments, regression estimation of similarity values between objects is also possible. To do so, for example, a genuine similarity between a pair of objects i and j is given as a teaching value, and a loss value is defined based on the squared error from an estimated similarity score as expressed by the following equation.

$$\text{Loss value}=\Sigma_i\Sigma_j(\text{genuine pair similarity score}(f_i,f_j)-\text{pair similarity score}(f_i,f_j))^2. \quad \text{(Equation 10)}$$

The parameters of the feature amount transformation units 105 and 106 are learned to reduce the loss value. Here, $f_i$, and $f_j$ are a pair of feature amounts of images transformed using the first trained model and the second trained model. As described above, the present invention is applicable to various tasks.

The present invention can also be realized by executing the following processing. Specifically, software (program) for realizing the functions of the above-described exemplary embodiments is supplied to a system or an apparatus via a network for data communication or various storage media. Then, a computer (or CPU or micro-processing unit (MPU)) of the system or the apparatus reads the program and executes the read program. Further, the program can be recorded in a computer-readable recording medium, and the computer-readable recording medium can be provided.

The present invention is not limited to the above-described exemplary embodiments, and various changes and modifications can be made without departing from the spirit or scope of the present invention. The following claims are attached to define the scope of the present invention publicly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to reduce information to be registered in verifying objects differing from each other in state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:

at least one processor; and at least one memory having stored thereon instructions which, when executed by the at least one processor, cause the image processing apparatus at least to:

acquire a first feature from a first image based on a first trained model configured to extract a feature from an image;

acquire a second feature from a second image based on a second trained model determined based on a state of the second image and configured to extract a feature from an image;

determine, based on the first feature and the second feature, whether an object in the first image and an object in the second image are the same; and train each of the first trained model and the second trained model based on a plurality of image groups different in state, so that a similarity between a feature extracted based on the first trained model and a feature extracted based on the second trained model is greater than a predetermined value, wherein the second trained model is a model having learned the second feature in a same feature space as that for the first trained model, wherein the plurality of image groups includes a first image group serving as a reference and a second image group obtained by transforming the first image group serving as the reference, wherein, in a case where an image included in the first image group and an image included in the second image group correspond to the same object, the training unit performs training to make a feature of the image included in the first image group and a feature of the image included in the second image group similar to each other, and wherein the second image group is obtained by combining an accouterment with the first image group.

2. The image processing apparatus according to claim 1, wherein the instructions further cause the image processing apparatus to:

determine whether the second image satisfies a predetermined condition, and determine the second trained model based on a result of the predetermined condition determination.

3. The image processing apparatus according to claim 2, wherein the predetermined condition relates to at least one of state including image quality of an input image, object appearance angle, object size, clarity of object appearance, illumination brightness/darkness, object occlusion, presence/absence of an attachment and/or an accouterment of the object, and a sub-type of the object.

4. The image processing apparatus according to claim 2, wherein, in a case where a person in the second image is wearing a mask, the instructions cause the image processing apparatus to determine a trained model different from the first trained model as the second trained model.

5. The image processing apparatus according to claim 1, wherein the first trained model and the second trained model each include a neural network with a plurality of layers.

6. The image processing apparatus according to claim 5, wherein the first trained model and the second trained model share a parameter of a part of the layers.

7. The image processing apparatus according to claim 5, wherein the first trained model and the second trained model are a transformer network.

8. The image processing apparatus according to claim 1, wherein the second trained model is trained based on a feature extracted based on the first trained model after training the first trained model.

9. The image processing apparatus according to claim 1, wherein the first trained model and the second trained model perform parameter training simultaneously or alternately.

10. The image processing apparatus according to claim 1, wherein the instructions further cause the image processing apparatus to acquire an intermediate feature of the first image based on a third trained model configured to output a feature relating a state of an object from an image; and determine a parameter for the first trained model based on the acquired intermediate feature of the first image.

11. The image processing apparatus according to claim 10, wherein the instructions further cause the image processing apparatus to:

acquires an intermediate feature of the second image, determines a parameter for the second trained model based on the acquired intermediate feature of the second image, and wherein, in a case where an attribute of the object indicated by the intermediate feature of the first image and an attribute of the object indicated by the acquired intermediate feature of the second image are different, a parameter different from the parameter for the first trained model is determined to be the parameter for the second trained model.

12. The image processing apparatus according to claim 11, wherein the instructions cause the image processing apparatus to acquires the second feature using the intermediate feature of the second image.

13. The image processing apparatus according to claim 10, wherein the instructions cause the image processing apparatus to acquire the first feature using the intermediate feature of the first image.

14. An image processing method, comprising:

acquiring, as first acquiring, a first feature from a first image based on a first trained model configured to extract a feature from an image;

acquiring, as second acquiring, a second feature from a second image based on a second trained model determined based on a state of the second image and configured to extract a feature from an image; and determining, as verifying, whether an object in the first image and an object in the second image are the same, based on the first feature and the second feature, training each of the first trained model and the second trained model based on a plurality of image groups different in state, so that a similarity between a feature extracted based on the first trained model and a feature extracted based on the second trained model is greater than a predetermined value, wherein the second trained model is a model having learned the second feature in a same feature space as that for the first trained model, wherein the plurality of image groups includes a first image group serving as a reference and a second image group obtained by transforming the first image group serving as the reference, wherein, in a case where an image included in the first image group and an image included in the second image group correspond to the same object, the training unit performs training to make a feature of the image included in the first image group and a feature of the image included in the second image group similar to each other, and wherein the second image group is obtained by combining an accouterment with the first image group.

15. A non-transitory storage medium storing a program for causing a computer to perform:

acquiring, as first acquiring, a first feature from a first image based on a first trained model configured to extract a feature from an image;

acquiring, as second acquiring, a second feature from a second image based on a second trained model determined based on a state of the second image and configured to extract a feature from an image; and determining, as verifying, whether an object in the first image and an object in the second image are the same, based on the first feature and the second feature, training each of the first trained model and the second trained model based on a plurality of image groups different in state, so that a similarity between a feature extracted based on the first trained model and a feature extracted based on the second trained model is greater than a predetermined value, wherein the second trained model is a model having learned the second feature in a same feature space as that for the first trained model, wherein the plurality of image groups includes a first image group serving as a reference and a second image group obtained by transforming the first image group serving as the reference, wherein, in a case where an image included in the first image group and an image included in the second image group correspond to the same object, the training unit performs training to make a feature of the image included in the first image group and a feature of the image included in the second image group similar to each other, and wherein the second image group is obtained by combining an accouterment with the first image group.

* * * * *